US012608308B2

(12) United States Patent
Zhang et al.

(10) Patent No.: US 12,608,308 B2
(45) Date of Patent: Apr. 21, 2026

(54) IN-MEMORY PARTIAL CHECKSUM CALCULATION WITH FLEXIBLE MEDIA COVERAGE

(71) Applicant: SK hynix Inc., Gyeonggi-do (KR)

(72) Inventors: Fan Zhang, San Jose, CA (US);
Meysam Asadi, San Jose, CA (US);
Qiuju Diao, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/824,845

(22) Filed: Sep. 4, 2024

(65) Prior Publication Data

US 2026/0064582 A1      Mar. 5, 2026

(51) Int. Cl.
*G06F 12/00*          (2006.01)
*G06F 12/02*          (2006.01)

(52) U.S. Cl.
CPC ................................. *G06F 12/0246* (2013.01)

(58) Field of Classification Search
CPC ............. G06F 12/0246; G06F 11/1076; G06F 11/1008; H03M 13/616; H03M 13/1108; H03M 13/1128; H03M 13/00
USPC ........................................................ 711/103
See application file for complete search history.

(56) References Cited

U.S. PATENT DOCUMENTS

| | | | | |
|---|---|---|---|---|
| 9,160,373 | B1 * | 10/2015 | Varnica | .............. H03M 13/1102 |
| 11,502,703 | B2 | 11/2022 | Zhang et al. | |
| 2005/0283707 | A1 * | 12/2005 | Sharon | ................ H03M 13/635 |
| | | | | 714/758 |
| 2007/0198901 | A1 * | 8/2007 | Ramchandran | ....... G06F 9/3877 |
| | | | | 714/781 |
| 2010/0251059 | A1 | 9/2010 | Dielissen | |
| 2014/0075261 | A1 | 3/2014 | Li et al. | |
| 2022/0269560 | A1 * | 8/2022 | Chung | .............. H03M 13/1102 |

FOREIGN PATENT DOCUMENTS

NL          8302214 A   *   1/1985   ........ H03M 13/1575

* cited by examiner

*Primary Examiner* — Mardochee Chery
(74) *Attorney, Agent, or Firm* — IP & T GROUP LLP

(57)          ABSTRACT

A memory device and method for a partial checksum calculation using a sub-matrix with flexible media coverage inside of a memory device (i.e., NAND) of a memory system. The memory device includes: a plurality of memory cells; a control circuit configured to read a codeword sequence from the plurality of memory cells, and determine a sub-matrix including multiple non-zero circulants selected from particular matrix rows of a parity check matrix used in a controller of the memory system, the multiple non-zero circulants including non-zero row circulants for each matrix row; and a partial checksum calculator configured to perform a partial checksum calculation on a syndrome sequence based on the codeword sequence and the sub-matrix.

20 Claims, 19 Drawing Sheets

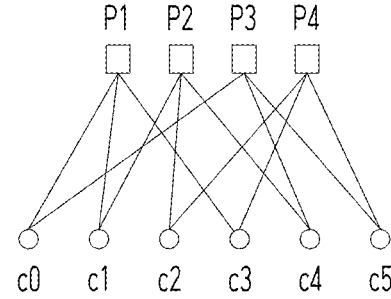

$$H = \begin{bmatrix} 1 & 1 & 0 & 1 & 0 & 0 \\ 0 & 1 & 1 & 0 & 1 & 0 \\ 1 & 0 & 0 & 0 & 1 & 1 \\ 0 & 0 & 1 & 1 & 0 & 1 \end{bmatrix} \begin{matrix} p_1 \\ p_2 \\ p_3 \\ p_4 \end{matrix}$$

with columns $c_0$ $c_1$ $c_2$ $c_3$ $c_4$ $c_5$ e.g.  $p_1 = c_0 \oplus c_1 \oplus c_3$ Codeword $C = [0\ 0\ 1\ 0\ 1\ 1] \rightarrow S_C = H \cdot C^T = [0\ 0\ 0\ 0] \rightarrow cs(C) = w(S_C) = 0.$ Sequence $X = [0\ \underline{1}\ 1\ 0\ 1\ 1] \rightarrow S_X = H \cdot X^T = [1\ 1\ 0\ 0] \rightarrow cs(X) = w(S_X) = 2.$ Sequence $X' = [\underline{1}\ \underline{1}\ 1\ \underline{1}\ 1\ 1] \rightarrow S_{X'} = H \cdot X'^T = [1\ 1\ 1\ 1] \rightarrow cs(X') = w(S_{X'}) = 4.$ $$H_1 = \begin{bmatrix} 1 & 1 & 0 & 1 \\ 0 & 1 & 1 & 0 \\ 1 & 0 & 0 & 0 \end{bmatrix} \begin{matrix} p_1 \\ p_2 \\ p_3 \end{matrix}$$

with columns $c_0$ $c_1$ $c_2$ $c_3$

CS is good estimator for FBC in this region

CS is saturated In this region

Average Checksum

Error Num

Figure 10:
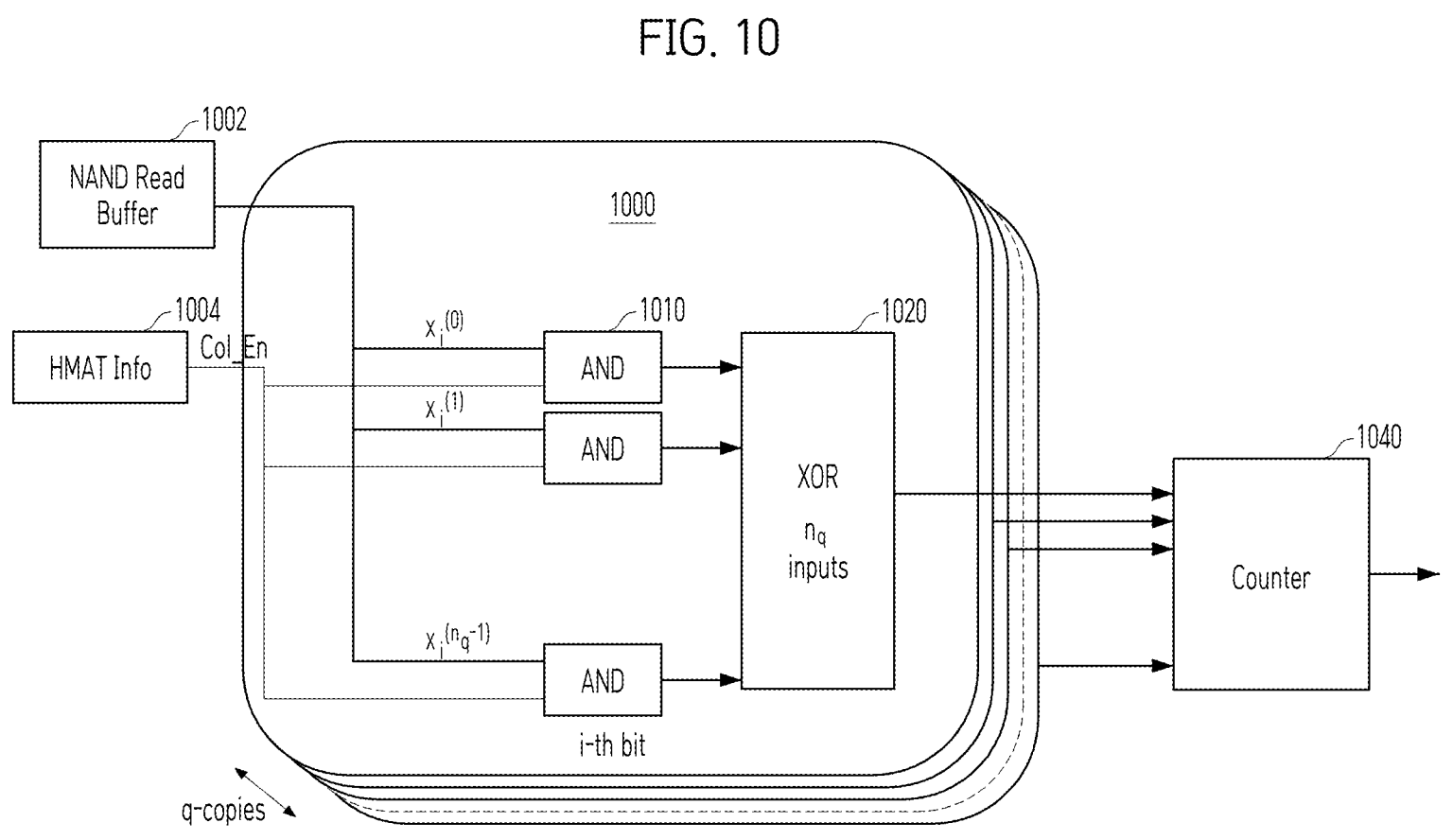

1002 NAND Read Buffer

1004 HMAT Info

Col_En

1010 AND $x_i^{(0)}$

AND $x_i^{(1)}$

AND $x_i^{(n_q-1)}$ i-th bit

1020 XOR $n_q$ inputs

1040 Counter q-copies

1201

Select a subset matrix from an ECC
parity-check matrix used in the controller

1203

Perform a partial checksum calculation using the
subset matrix to estimate bit error rate (BER)

1205

Optionally, perform the partial checksum
calculation utilizing a gate-count efficient syndrome
calculator module which resides close to the
memory device where actual data is stored

In-NAND CS

NAND Read Buffer 904

DSC 256bits 902

Logic 906

XOR 908

DFF 912

Counter 914

HMAT Info 910

Control 916 clock

Selected Rows for
Syndrome Calculation

Original Parity Check Matrix

Syndrome Register Array for Sub-matrix (Method 1)

Syndrome Register Array for Sub-matrix (Method 2)

Figure 20:
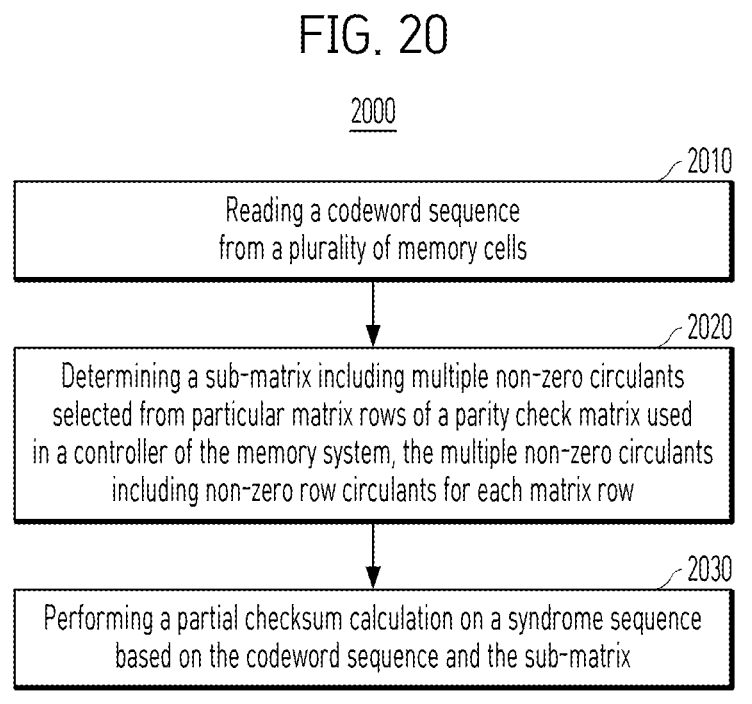

Reading a codeword sequence
from a plurality of memory cells

2020

Determining a sub-matrix including multiple non-zero circulants
selected from particular matrix rows of a parity check matrix used
in a controller of the memory system, the multiple non-zero circulants
including non-zero row circulants for each matrix row

2030

Performing a partial checksum calculation on a syndrome sequence
based on the codeword sequence and the sub-matrix

IN-MEMORY PARTIAL CHECKSUM CALCULATION WITH FLEXIBLE MEDIA COVERAGE

BACKGROUND

1. Field

The present invention relates to the processing of low-density parity-check (LDPC) codes in solid-state drives.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices. Data storage devices using memory devices provide excellent stability, durability, high information access speed, and low power consumption, since they have no moving parts. Examples of data storage devices having such advantages include universal serial bus (USB) memory devices, memory cards having various interfaces, and solid-state drives (SSD).

The SSD may include flash memory components and a controller, which includes the electronics that bridge the flash memory components to the SSD input/output (I/O) interfaces. The SSD controller can include an embedded processor that can execute functional components such as firmware. The SSD functional components are device-specific, and in most cases, can be updated. One type of flash memory components is named NAND after the NAND logic gates in this SSD. The NAND-type flash memory may be written and read in blocks (or pages) which are generally much smaller than the entire memory space. The NAND-type operates primarily in memory cards, USB flash drives, solid-state drives, and similar products, for general storage and transfer of data.

NAND flash manufacturers have been pushing the limits of their fabrication processes towards 20 nm and lower, which often leads to a shorter usable lifespan and a decrease in data reliability. Accordingly, error correction is needed to improve the data integrity. One such error correction code ECC is a low-density parity-check (LDPC) code.

In this context, embodiments of the present invention for processing LDPC codes arise.

SUMMARY

Aspects of the present invention include a system and a method for a partial checksum calculation using a sub-matrix with flexible media coverage inside of a memory device (i.e., NAND) of a memory system.

In one aspect of the present invention, a memory device of a memory system includes: a plurality of memory cells; a control circuit configured to read a codeword sequence from the plurality of memory cells, and determine a sub-matrix including multiple non-zero circulants selected from particular matrix rows of a parity check matrix used in a controller of the memory system, the multiple non-zero circulants including non-zero row circulants for each matrix row; and a partial checksum calculator configured to perform a partial checksum calculation on a syndrome sequence based on the codeword sequence and the sub-matrix.

In another aspect of the present invention, a method for operating a memory device of a memory system includes: reading a codeword sequence from a plurality of memory cells; determining a sub-matrix including multiple non-zero circulants selected from particular matrix rows of a parity check matrix used in a controller of the memory system, the multiple non-zero circulants including non-zero row circulants for each matrix row; and performing a partial checksum calculation on a syndrome sequence based on the codeword sequence and the sub-matrix.

BRIEF DESCRIPTION OF THE DRAWINGS

FIG. 7 is a depiction of a parity-check matrix H, its corresponding Tanner graph, checksums for bit sequence with different errors, and a partial parity-check matrix $H_1$ selected from components of H, in accordance with embodiments of the present invention.

FIG. 10 is a schematic of a checksum calculator module in accordance with one embodiment of the present invention.

FIG. 14 is a depiction of a system on chip (SOC) and NAND where data to be descrambled is transferred to a descrambler of the SOC.

FIG. 16 is a block diagram of an in-NAND CS module in accordance with embodiments of the present invention.

FIG. 20 is a flow chart illustrating one specific method 2000 for performing an in-memory partial checksum calculation with flexible media coverage, inside a storage of a memory system, according to another embodiment of the present invention.

DETAILED DESCRIPTION

Figure 1:
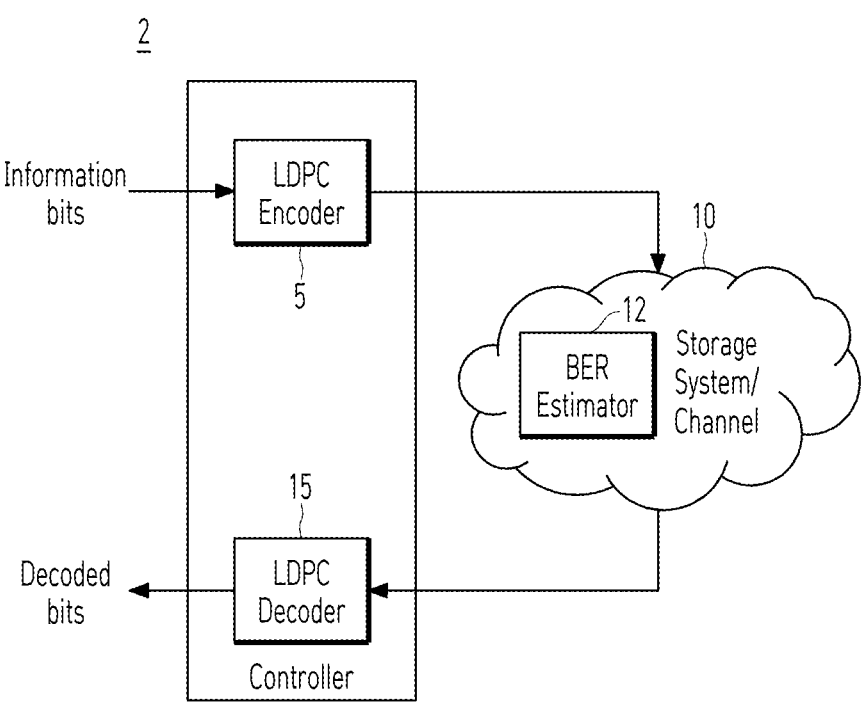
FIG. 1 is a high-level block diagram illustrating an error correcting system in accordance with embodiments of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention encompasses numerous alternatives, modifications and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

FIG. 1 is a high-level block diagram illustrating an error correcting system 2, in accordance with embodiments of the present invention. More specifically, the high-level block diagram in FIG. 1 shows error correcting system 2 including an encoder 5 and a decoder 15 using for example LDPC coding and decoding algorithms. That is, error correcting system 2 may include a LDPC encoder 5 and a LDPC decoder 15, although other coding and decoding algorithms can be used.

Figure 2:
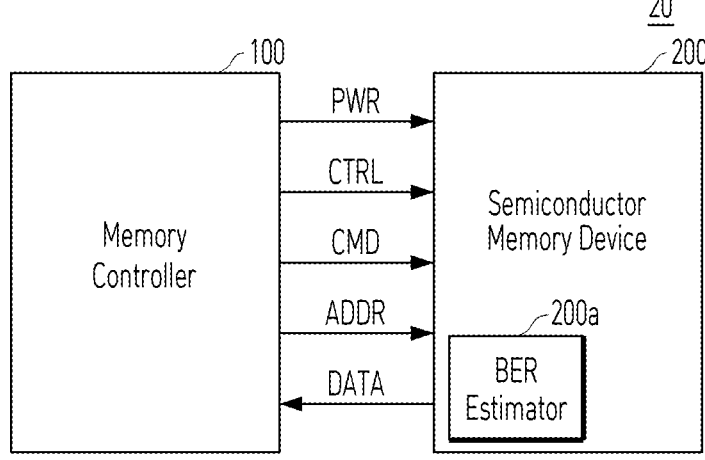
FIG. 2 is a block diagram schematically illustrating a memory system in accordance with embodiments of the present invention.

The LDPC encoder 5 may receive information bits including data which is desired to be stored in a storage system 10 (such as in memory system 20 of FIG. 2). The LDPC encoder 5 may encode the information bits to output LDPC encoded data by calculating LDPC parity and appending to the data containing the information bits the LDPC parity. The LDPC encoded data from the LDPC encoder 5 may be written to a storage device or memory device of the storage system 10. The storage system 10 may include a bit error rate (BER) estimator 12. In various embodiments, the storage device may include a variety of storage types or media. In some embodiments, during being written to or read from the storage device, data is transmitted and received over a wired and/or wireless channel. In this case, the errors in the received codeword may be introduced during transmission of the codeword.

When the stored data in the storage system 10 is requested or otherwise desired (e.g., by an application or user which stored the data), the LDPC decoder 15 may perform LDPC decoding of data received from the storage system 10, which may include some noise or errors. In various embodiments, the LDPC decoder 15 may perform LDPC decoding using as determined by input bit values as determined by soft or hard decisions and/or reliability information for the received data. The decoded bits generated by the LDPC decoder 15 are transmitted to the appropriate entity (e.g., the user or application which requested it). With proper encoding and decoding, the information bits match the decoded bits.

When the stored data in storage system 10 is requested or otherwise desired (e.g., by an application or user which stored the data), the LDPC decoder 15 may receive data from the storage system 10. The received data may include some noise or errors. The LDPC decoder 15 may perform detection on the received data and output bit values and/or reliability information. The LDPC decoder 15 may include one of a soft detector and a hard detector. Either the soft detector or the hard detector can provide channel information for decoders, such as the LDPC decoder. For example, the soft detector may output reliability information and a bit value decision for each detected bit. On the other hand, the hard detector may output a hard decision on each bit without providing corresponding reliability information. As an example, the hard detector may output as the hard decision that a particular bit is a "1" or a "0" without indicating how certain or sure the detector is in that decision. In contrast, the soft detector may output a bit value decision and reliability information associated with the decision. In general, reliability information indicates how certain the detector is in a given bit value decision. In one example, a soft detector may output a log-likelihood ratio (LLR) where the sign indicates the decision (e.g., a positive value corresponds to a "0" decision and a negative value corresponds to a "1" decision) and the magnitude indicates how sure or certain the detector is in that bit value decision (e.g., a large magnitude indicates a high reliability or certainty).

LDPC decoder 15 may perform LDPC decoding using the decision and/or reliability information. The decoded bits generated by the LDPC decoder 15 can be transmitted to the appropriate entity (e.g., the user or application which requested it). With proper encoding and decoding, the information bits match the decoded bits.

In LDPC decoding, a syndrome update may check to see if all of the errors have been removed from a codeword containing user data or bit data. For example, if for the parity-check matrix H, the LDPC syndrome vector $\hat{c}H=0$, and thus the checksum representing the number of nonzero elements in the syndrome vector is 0, then the syndrome update can determine that decoding is successful and all errors have been removed from the codeword. If so, the LDPC decoding stops decoding and outputs $\hat{c}=[\hat{c}1, \hat{c}2, \ldots \hat{c}N]$ as the decoded output.

If the LDPC checksum is not equal to zero and thus the LDPC syndrome vector is not equal to zero, the decoded codeword (i.e., $\hat{c}$) is not output and another decoding iteration is performed until a maximum number of iterations, which may be predefined, is reached. In other words, a variable node update calculates new variable to check node (V2C) messages and new log likelihood ratios (LLR) values, the check node update calculates new check to variable node (C2V) messages, and the codeword update calculates a new codeword and checks if the product of the new codeword and the parity-check matrix is 0, that is $\hat{c}H=0$.

If a correct codeword is not found, the iterations continue with another update from the variable nodes using the messages that they received from the check nodes to decide if the bit at their position should be a zero or in some embodiments a one by a majority rule. The variable nodes then send this hard decision message to the check nodes that are connected to them. The iterations continue until a correct codeword is found.

In some embodiments, an LDPC decoding operation may be performed according to bit-flipping decoding. In bit-flipping decoders, the decoder may process a fixed number W of variable nodes (VN) in one clock-cycle. That is for each of the VNs to be processed in a cycle, the decoder counts the number of neighboring check nodes (CN) that are unsatisfied and compares this number with a threshold T. If the count is larger than the threshold T, the decoder flips the current bit-value of the VN. The variable nodes are typically each processed one-by-one from the first variable node to the last variable node. In some other embodiments, an LDPC decoding operation may be performed based on min-sum decoding.

FIG. 2 is a block diagram schematically illustrating a memory system 20 in accordance with another embodiment of the present invention.

Referring FIG. 2, the memory system 20 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. Similar to storage 10 of FIG. 1. the semiconductor memory device 200 may include bit error rate (BER) estimator 200a. The semiconductor memory device 200 may receive a command CMD, an address ADDR and data DATA through input/output lines. The semiconductor memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as a solid-state drive (SSD). The solid-state drive may include a storage device such as a NAND memory for storing data therein.

The memory controller 100 and the semiconductor memory device 200 may be integrated in a single semiconductor device such as a memory card. For example, the memory controller 100 and the semiconductor memory device 200 may be integrated in a single semiconductor device configured to have a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), or a universal flash storage (UFS).

In another example, the memory system 20 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 3:
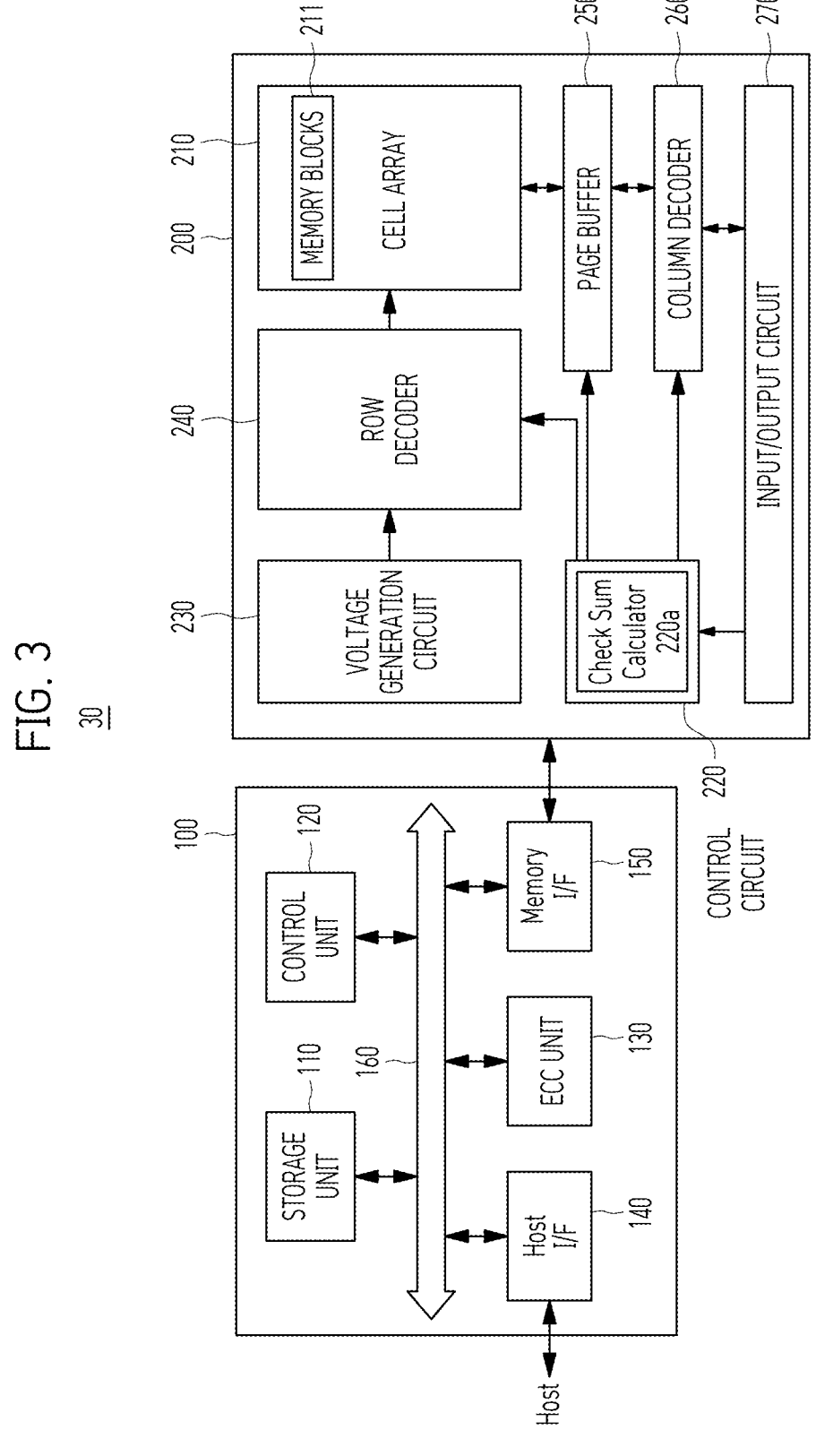
FIG. 3 is a block diagram illustrating a memory system in accordance with embodiments of the present invention.

FIG. 3 is a detailed block diagram illustrating various embodiments of memory system 30. For example, memory system 30 of FIG. 3 may depict the storage system 10 shown in FIG. 1 or the memory system 20 shown in FIG. 2.

Referring to FIG. 3, the memory system 30 may include the memory controller 100 and the semiconductor memory device 200. The memory system 30 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder or a digital video player. In some embodiments, the host device may include a portable electronic device such as a mobile phone, a smart phone, an e-book, an MP3 player, a portable multimedia player (PMP), or a portable game player.

The memory device 200 may store data to be accessed by the host device.

The memory device 200 may be implemented with various memory devices such a NAND flash memory, which is particularly advantageous for reasons noted below. However, the present invention is not so limited and other volatile and non-volatile memory devices may be used such as for example a dynamic random access memory (DRAM) and a static random access memory (SRAM), a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The controller 100 may control storage of data in the memory device 200. For example, the controller 100 may control the memory device 200 in response to a request from the host. The controller 100 may provide the data read from the memory device 200, to the host, and store the data provided from the host into the memory device 200. In one embodiment, especially for NAND flash based memory systems, memory controller 100 may include a scrambler for scrambling data, which is to be written to the memory device 200, and a descrambler for descrambling data, which is read from the memory device 200.

The controller 100 may include a storage unit 110, a control unit 120, the error correction code (ECC) unit 130, a host interface 140 and a memory interface 150, which are coupled through a bus 160.

The storage unit 110 may serve as a working memory of the memory system 10 and the controller 100, and store data for driving the memory system 10 and the controller 100. When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

Referring to FIG. 3, the control unit 120 may control general operations of the memory system 30, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the memory device 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as an LDPC code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

As shown in FIG. 3, host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), or an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control unit (e.g., CPU) 120. When the memory device 200 is a flash memory such as a NAND flash memory, the memory interface 150 may generate control signals for the memory and process data under the control of the control unit 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The control circuit 220 includes in one embodiment of the present invention checksum calculator module 220a (described in more detail below). The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 may be connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270. The control circuit 220 may control the peripheral circuit in response to the command and the address.

Figure 4:
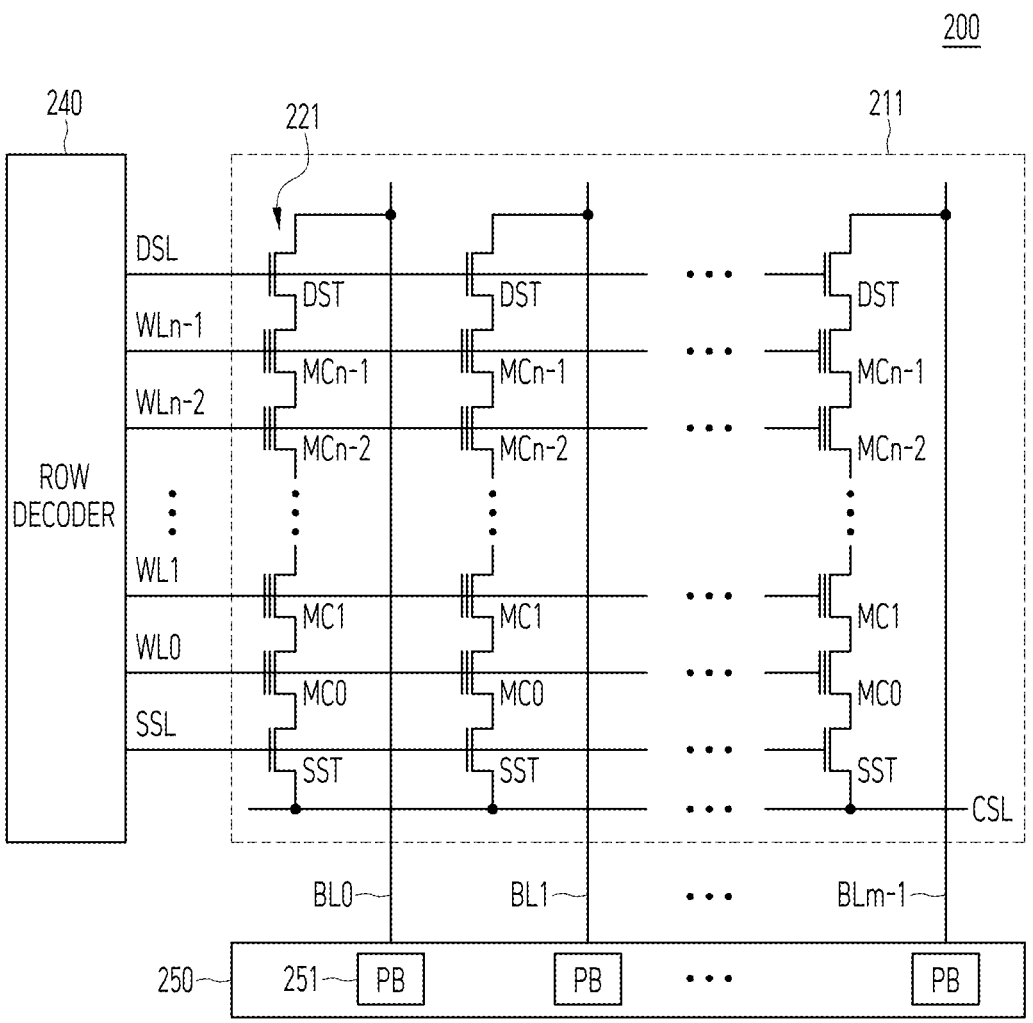
FIG. 4 is a circuit diagram illustrating a memory block of a memory device in accordance with embodiments of the present invention.

FIG. 4 is a circuit diagram illustrating a memory block of a semiconductor memory device in accordance with an embodiment of the present invention. For example, a memory block of FIG. 4 may be the memory blocks 211 of the memory cell array 210 shown in FIG. 3.

Referring to FIG. 4, the memory blocks 211 may include a plurality of cell strings 221 coupled to bit lines BL0 to BLm−1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn−1 may be formed of a multi-level cell (MLC) storing data information of multiple bits in each cell. The cell strings 221 may be electrically coupled to the corresponding bit lines BL0 to BLm−1, respectively.

The page buffer 250 may include a plurality of separate page buffers PB 251 that are coupled to the bit lines BL0 to BLm−1. The page buffers PB 251 may operate in response to page buffer control signals. For example, the page buffers PB 251 may temporarily store data received through the bit lines BL0 to BLm−1 or sense voltages or currents of the bit lines during a read or verify operation.

In NAND Checksum Calculator

Figure 5:
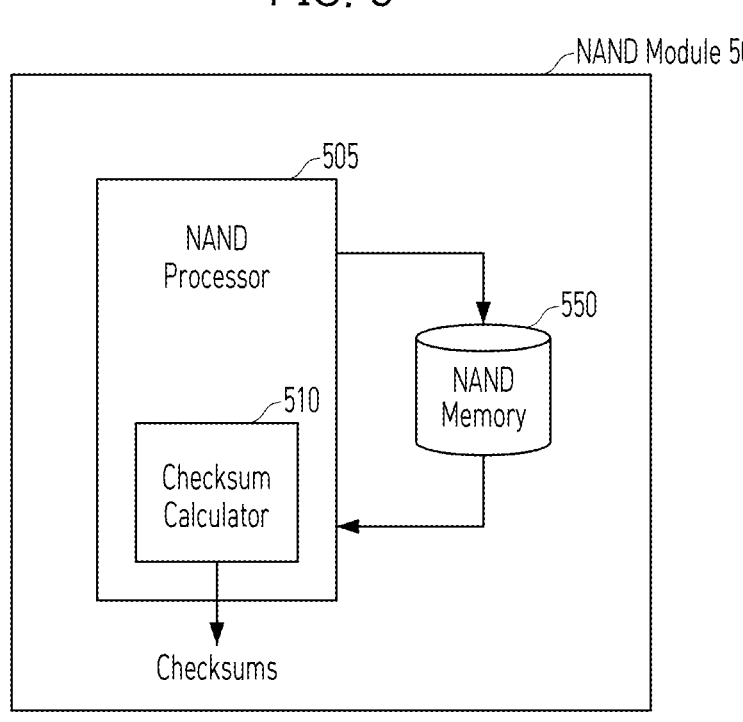
FIG. 5 is a diagram illustrating a storage system in accordance with embodiments of the present invention.

FIG. 5 is a diagram illustrating a storage system in accordance with embodiments of the present invention where the NAND module 500 shown in FIG. 5 uses NAND memory 550 which may correspond to memory device 200 in FIG. 3.

Referring to FIG. 5, the NAND module 500 may include NAND memory 550 as storage and includes therein NAND processor 505. The NAND processor 505 may perform a read operation on data in NAND memory 550. During the read operation, the NAND processor 505 may read data from the NAND memory 550, which may include some noise or errors, and perform checksum calculations for the read data to estimate RBER. As noted above, when the number of the error bits is greater than or equal to a threshold number of correctable error bits, an error correction fail signal may be output indicating failure in correcting the error bits. Such failure may require that the information bits from a host will need to be sent again to NAND memory 550. Accordingly, checksum calculator 510 can be used to provide an estimate of the RBER in data to be stored in NAND memory 550.

In various embodiments, the NAND module 500 shown in FIG. 5 may be implemented using a variety of techniques including an application-specific integrated circuit (ASIC), a field-programmable gate array (FPGA), and/or a general purpose processor (e.g., an Advanced RISC Machine (ARM) core). In one embodiment of the present invention, checksum calculator 510 utilizes a gate-count efficient syndrome calculator module such as the in-NAND checksum calculator module 1000 shown in FIG. 10 to perform partial checksum calculations.

Figure 6:
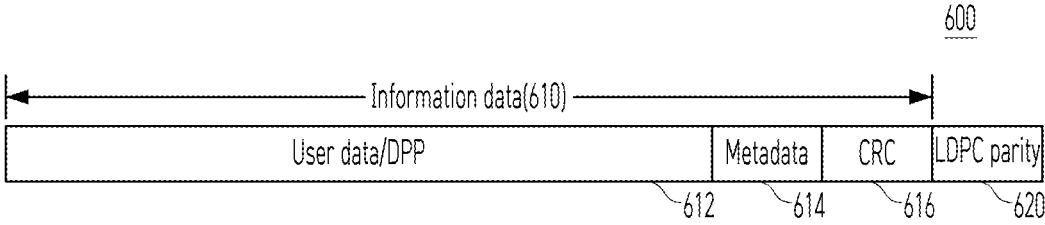
FIG. 6 is a diagram illustrating a format of a codeword to be stored in a storage system in accordance with embodiments of the present invention.

As background, FIG. 6 is a diagram illustrating a format of a codeword 600 to be stored in a storage system. Referring to FIG. 6, the codeword 600 may include information data 610 (information bits or user data) and LDPC parity data 620. In some embodiments, the codeword 600 may be generated by the LDPC codes noted above.

The information data 610 may include user data with data path protection (DPP) 612, meta-data 614 and cyclic redundancy check (CRC) parity bits 616. A CRC code which is an error-detecting code commonly used in digital networks and storage devices may detect accidental changes to raw data. In a typical LDPC decoder, if the LDPC checksum is zero, the decoding may be terminated. The CRC parity bits 616 will be computed based on the decoded user data 612 and meta-data 614 after the LDPC decoding. If the computed CRC parity bits match the decoded CRC parity bits, decoding may be successful. Otherwise, a mis-correction may be declared.

As more background, in SSD applications, a system-on-a-chip (SOC) and firmware (FW) often have house-keeping tasks such as media scan, read voltage threshold adaptation to monitor/maintain NAND quality. These tasks not only collide with host read request(s) which degrade the performance and quality of service (QOS), but also a substantial amount of data needs to be transfer between the NAND and the SOC which causes a power drop. Referring back to FIG. 3, when memory controller 100 (comprising a SOC) with control unit 120 performing these tasks, a substantial amount of data needs to be transfer between the memory device 200 and the controller 100 which causes a power drop.

In order to run these house-keeping tasks more efficiently, in one embodiment of the present invention, the semiconductor memory device 200 (in FIG. 3) or NAND module 500 (in FIG. 5) may measure the checksum of LDPC code(s) to estimate the number of errors in the stored data. Such an in-NAND module calculating the RBER (or estimating the RBER from a checksum calculation) can improve the performance/power of SSD drives on house-keeping tasks by eliminating the need to transfer the stored data to the SOC.

In one embodiment of the present invention, the in-NAND module comprises a checksum calculator (e.g., check sum calculator 220a or checksum calculator 510) and can use quasi-cyclic (QC) LDPC codes. By using QC LDPC codes, in one embodiment, the in-NAND module can operate at a reduced gate-count. In another embodiment, by using QC LDPC codes, the in-NAND module can be used with different sized QC matrices. In another embodiment, by using QC LDPC codes, the in-NAND module can calculate checksums usually with only a few clock cycles to provide an estimate RBER for the stored data. In one embodiment of the present invention, in-NAND checksum calculator module 510 comprises a gate-count efficient syndrome calculator module.

Estimating RBER Using Checksum

If a codeword sequence C including the stored data contains no errors, then syndrome $S=H \cdot C^T=$all 0's, where H is the LDPC matrix. In general, if a bit sequence X contains at least one error, then syndrome $S=H \cdot X^T \neq$all 0's. Checksum (CS) or Syndrome Weight is defined as $cs=w(S)=$number of 1's in the syndrome sequence. FIG. 7 shows one example of a LDPC matrix H and its corresponding Tanner graph. FIG. 7 shows check nodes P which represent the results of parity-check equations. Each check node corresponds to one element in the syndrome vector, which is typically one bit. FIG. 7 also shows the checksum corresponding to three (3) different bit sequences: 1) the codeword C sequence containing the data bit information when properly stored with no bit errors, 2) the X sequence having one bit in error denoted by the underscoring under the second bit in the sequence, and 3) the X' sequence having three bits in error denoted by the underscoring under the first, second, and third bits in the sequence. FIG. 7 shows that the checksum for the codeword C having no bit errors sequence equals 0. If the number of errors in a sequence is higher, then the corresponding checksum is also larger (e.g., the X' sequence with 3 bits in error from codeword C has a higher checksum than the X sequence with a single bit error from C $(cs(X')>cs(X))$.

Figure 8:
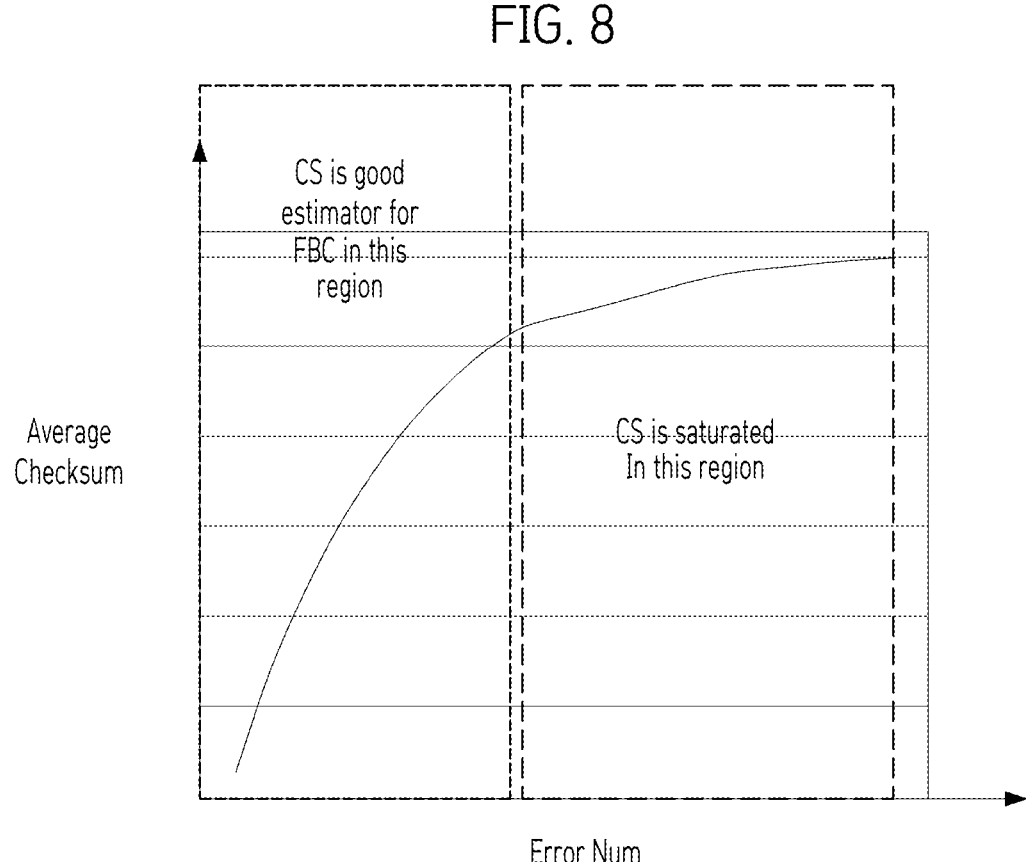
FIG. 8 is a depiction of a relationship between checksum and number of error bits for a typical LDPC code in accordance with embodiments of the present invention.

Let m be the number of check nodes in a parity-check matrix. FIG. 8 shows a relationship between the calculated average checksum averaging the checksums of selected sequences of bits (not necessarily stored in a memory) and the number of bit errors in the selected sequences for a typical LDPC code. Usually, a larger number of error bits results in a higher corresponding average checksum becomes for the selected sequence. However, since the average checksum shown in FIG. 8 is saturated around m/2, the slope between average checksum and error number usually decays as the error number increases. Thus, in one embodiment of the invention, the average checksum for a selected sequence of data bits is used as an estimator for failed bit counts in a RBER regions (such as in the region on the left-hand side in the FIG. 8) where number of errors for the selected sequence of data bits is relatively low.

In-NAND CS Calculations for Quasi-Cyclic (QC) LDPC Codes

In one embodiment of the present invention, the in-NAND checksum calculation can be simplified through the signal processing techniques described below.

A. Computing Partial Checksum Rather than Full Checksum

To reduce the design complexity, one embodiment of the present invention can calculate the checksum for a small group of rows in the original ERROR CODE parity-check matrix (that is a reduced set of rows in the original parity-check H-Matrix). Let H be the original parity-check matrix with size m×n, indicating m check nodes and n variable nodes in the LDPC code. The original checksum CS (the number of 1's in the syndrome S sequence) is a number in range [0, m], whose value usually is saturated around m/2. While the original checksum may be calculated for decoding purposes, in one embodiment of the present invention, a smaller (reduced) group of check nodes (a subset of size $m_1$ from the m rows in matrix H, denoted by $H_1$, $m_1 \le m$) is selected for calculating a partial checksum for estimating RBER. Thus, in one embodiment, the partial checksum takes value from range [0, $m_1$], and the value of the partial checksum is saturated at $m_1/2$. Computing a partial checksum in NAND can help in the following ways:

1) Storing $H_1$ information in NAND needs less memory for storing the reduced group of check nodes, and thus a reduced gate-count can be realized.

2) One method to increase correction capability in LDPC codes is to use rate-compatible punctured LDPC codes. With these punctured codes, a portion of parity symbols of a codeword is deliberately deleted (not stored in NAND) during the write process to increase coding rate, and the remaining coded symbols are written in NAND. During decoding, the deleted parity bits (i.e., the punctured bits) can be recovered at the first couple of iterations of an iterative decoding process such as described above. For punctured codes, the initial checksum (the checksum calculated before recovering the punctured bits) is usually very high. Thus, in one embodiment of the present invention, this checksum is not used to estimate RBER. Instead, in one embodiment of the present invention, partial checksums are used where the $H_1$ rows can be selected from those rows that do not have nonzero elements in the columns corresponding the punctured bits. This way the partial checksum from non-punctured sequence data can be used to estimate the RBER without the need to recover the punctured bits.

Figure 9A:
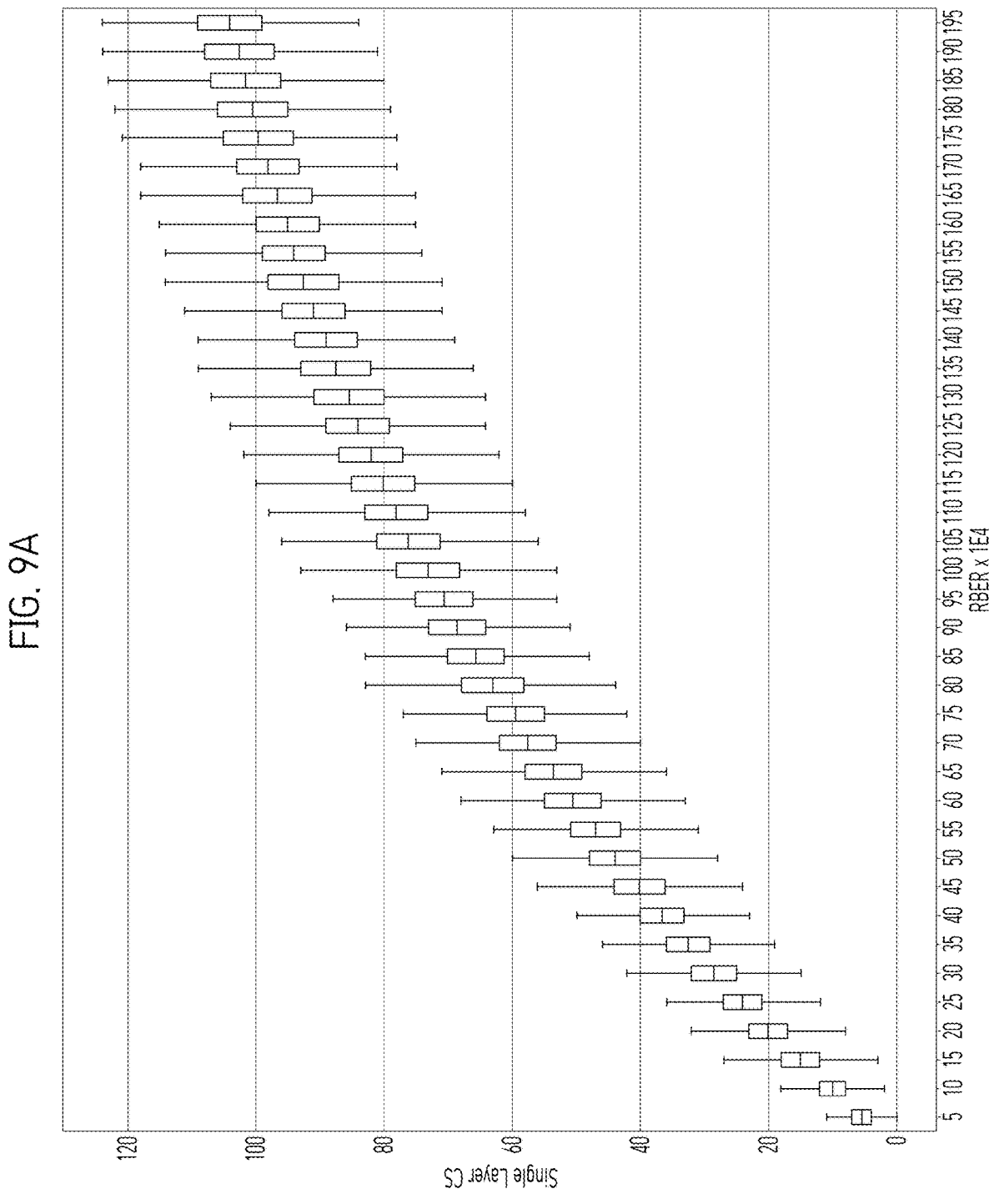
FIG. 9A is a depiction of a relationship between partial checksum and raw bit error rate (RBER) for a punctured LDPC code in accordance with embodiments of the present invention.

FIG. 9A is a depiction of a relationship between checksum and number of error bits for a reduced size LDPC code in accordance with embodiments of the present invention. In this depiction, the data is represented by box plot type representations with the extremes of the representations denoting the maximum and minimum RBER for the corresponding checksum, the box ends representing upper and lower statistical quartiles, with the bar in the middle of the box denoting the statistical median.

The relationship in FIG. 9A was obtained with a single circulant layer of a QC size of 256 from a punctured LDPC code. The original H matrix size is 4352×37376 (whereas the $H_1$ size is a reduced size of 256×37376). The circulant layer in $H_1$ used for calculation of a partial checksum was selected so that $H_1$ does not have any connection to the 512 punctured parity bits. Thus, in one embodiment, to compute partial checksum with the in-NAND checksum calculator of the present invention, the punctured parity bits are not needed, and the partial checksum information can be used to estimate the RBER similar to data shown in FIG. 8. The actual initial checksum (without recovering punctured bits) is close to 2146 for all RBERs.

Figure 9B:
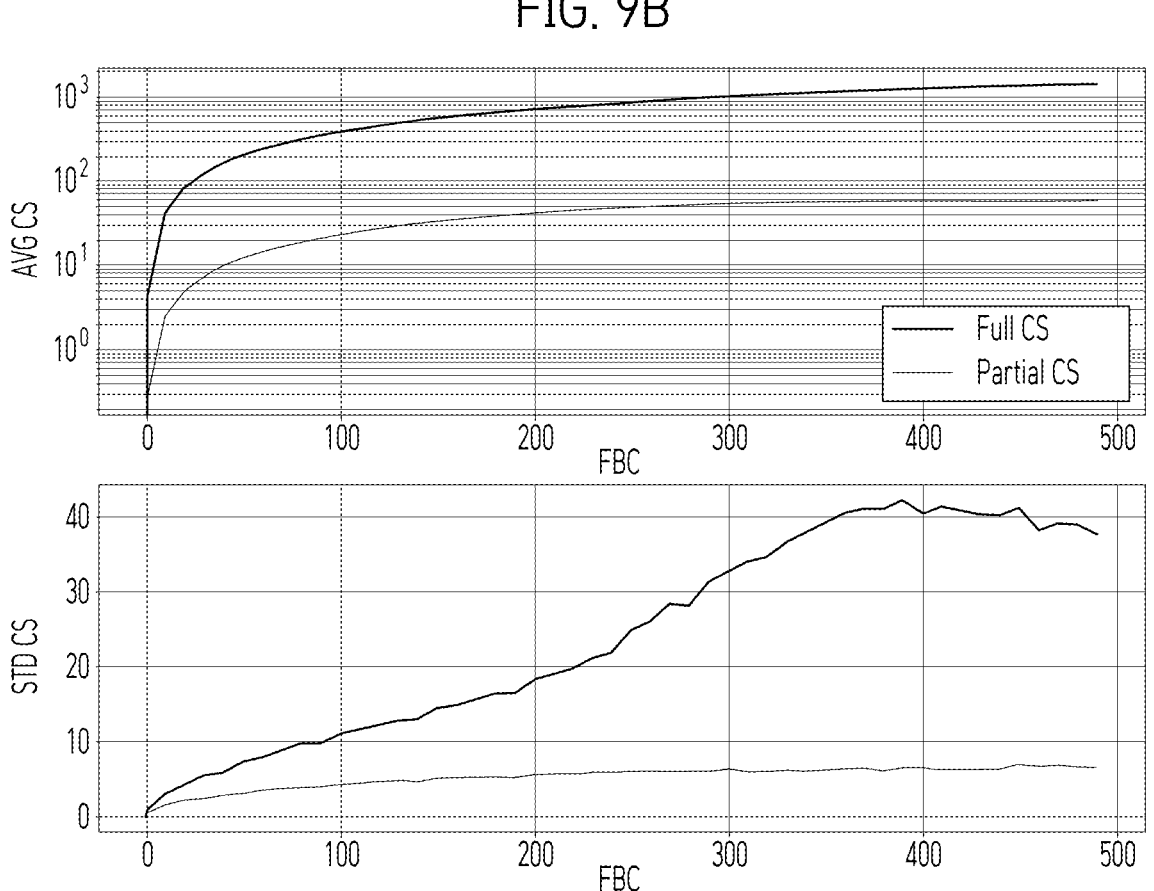
FIG. 9B is a depiction comparing results for estimating checksums using a full checksum calculation and a partial checksum calculation.

FIG. 9B is a depiction comparing results for estimating checksums using a full checksum calculation and a partial checksum calculation. The upper graph depicts the average checksum CS vs. the number failed bit counts FBC. The lower graph depicts the standard deviation of the checksum CS vs. the number count of failed bits FBC. The results show that the partial checksum calculations and the full checksum calculations follow the same trends with the average checksums (in both cases) rising quickly with FBC. Of note is the observation that the standard deviation STD for the partial checksum calculations are lower, thereby providing an added advantage to using partial checksum calculations.

B. Convert Shift Value to Zero for all Nonzero Circulants of Partial Checksum Matrix $H_1$ In a quasi-cyclic parity-check matrix, a parity-check matrix is composed of cyclic (or circulant) submatrices (or circulant layers) of the same size. A circulant submatrix is a square m×m binary matrix with the property that, each row is a shifted version of a previous row, formed by performing several-bit right-cyclic-shifts (or several-bit left-cyclic-shifts) on a base check matrix. To simplify the checksum calculation in the in-NAND checksum calculator of the present invention, the shift values between all the circulant submatrices can be converted to be equal to zero. This can be done by swapping columns and/or rows of matrix H, if one of the following conditions are met:

1) $H_1$ contains only one single layer or circulant row of the original matrix H, where each row of $H_1$ is referred to as a layer.

2) If $H_1$ contains more than one circulant rows of the original matrix H and the rows of $H_1$ are disjoint (the nonzero elements in the circulant rows are in different columns).

3) If $H_1$ contains more than one circulant rows [plural] of the original matrix H and for every combination of x circulant rows in H1 where x is a value in the range [2, m1], there are fewer than x circulant columns with nonzero elements in more than one circulant rows.

In one embodiment of the present invention, using this approach, the memory needed to store $H_1$ in the NAND storage is reduced because shift values are no longer need to be stored. Also, to align/correct bits in hardware, a module called barrel shifter is often used, which performs circular shifts of a vector with q bits, where the resulting offset can be selected dynamically. A barrel shifter is gate-count costly. In one embodiment of the present invention, since shift values are set to be equal to zero, a barrel shifter is not needed to calculate the partial checksum. By removing the need to use a barrel shifter, the gate count needed for the in-NAND (partial) checksum calculator described herein is substantially reduced.

FIG. 10 is a schematic of a checksum calculator module which can be used without necessarily a need for utilization of a barrel shifter in accordance with one embodiment of the present invention.

In FIG. 10, in-NAND checksum calculator module 1000 is in communication with NAND Read Buffer 1002 to provide codeword data such as the X bit sequences noted in FIG. 7. The in-NAND checksum calculator module 1000 is also in communication with HMAT Info 1004 which contains information about the entry values in party-check matric H used in the partial checksum calculation for the selected bit sequences. This information may describe characteristics of the parity-check matrix such as for example codeword length, number of information bits, circulant size, number of layers, and the like. As illustrated in FIG. 10, the X bit sequence data and column entry Col En data are supplied to a series of AND gates 1010 whose output is Exclusive OR summed by XOR unit 1020. Col_En represents a vector of nq bits, where each bit corresponds to one circulant column in H1. When as shown in FIG. 10, the Col_En data value supplied to an AND gate equals 1, then there are nonzero elements in the corresponding circulant column in H1. The HMAT Info 1004 including information about the entry values in the party-check matric H can be set by firmware programmed into for example control circuit 220 (of FIG. 3) or Checksum Calculator 510 (of FIG. 5) and can be used for the QC codes or punctured parity codes described above for generation of the column entries Col En. In one embodiment of the present invention, in-NAND checksum calculator module 1000 comprises a gate-count efficient syndrome calculator module.

As illustrated in FIG. 10, bit data from different circulants can be processed in parallel by the multiple of the in-NAND checksum calculator modules 1000, with the error from all the selected bit sequences totalized by counter 1040. The illustrated embodiment shown in FIG. 10 shows $n_q$ circulants processed together at the same time. In FIG. 10, the term "q-copies" means that only one circulant row in H1 is being processed. When there are more than one circulant rows being processed, then additional sets of q-copies with different Col_En inputs are used.

In one embodiment of the present invention, the in-NAND checksum calculator modules 1000 need not include barrel shifters to calculate the partial checksum.

In another embodiment, the in-NAND checksum calculator module uses a SEN (Scrambler-Encoder-NAND) order to store its data, whereby the checksum calculator module can use NAND read buffer data directly. As described in U.S. Pat. No. 11,502,703 (the entire contents of which are incorporated by reference), since programming data "as is" tends to decrease endurance (e.g., lifespan) or reliability of a memory system, a scrambler (or randomizer) randomizes data such that data is uniformly and more reliably programmed to a memory device. In one example, with reference to FIGS. 3 and 5, data from a host is scrambled by memory controller 100 to scramble the information bits in a codeword, the scrambled data is then encoded by memory controller 100, and then the scrambled data having scrambled information bits is passed to a buffer of NAND memory 550. At that time, before being stored in NAND memory 550, a checksum calculation performed by checksum calculator 510 can determine if the scrambled data has an acceptable RBER reflected by the checksum calculated. If acceptable, the scrambled data is stored in NAND memory 550. Accordingly, checksum calculations can be made by calculating checksums on scrambled-encoded data read from a buffer of a storage of a memory system, with the scrambled-encoded data having scrambled information bits.

C. Universal Partial Checksum Module

In one embodiment of the present invention, the in-NAND checksum module is not limited in the error processing operation chosen, and different SOCs for different applications (client/mobile/enterprise) are possible with the in-NAND checksum calculator module.

For instance, let the number of rows of partial parity-check matrix $H_1$ be $m_1$. The in-NAND checksum calculator can work for $H_1$ with QC size=$m_1$, $m_1/2$, $m_1/4$, or $m_1/8$.

As an example, let $m_1$=256, then the in-NAND CS module can calculate a partial checksum for $H_1$ containing either a single circulant layer with QC size=256, two circulant layers with QC size=128, four (4) circulant layers with QC size=64, or eight (8) circulant layers with QC size=32.

Computerized Method with Checksum Calculations

Figure 11:
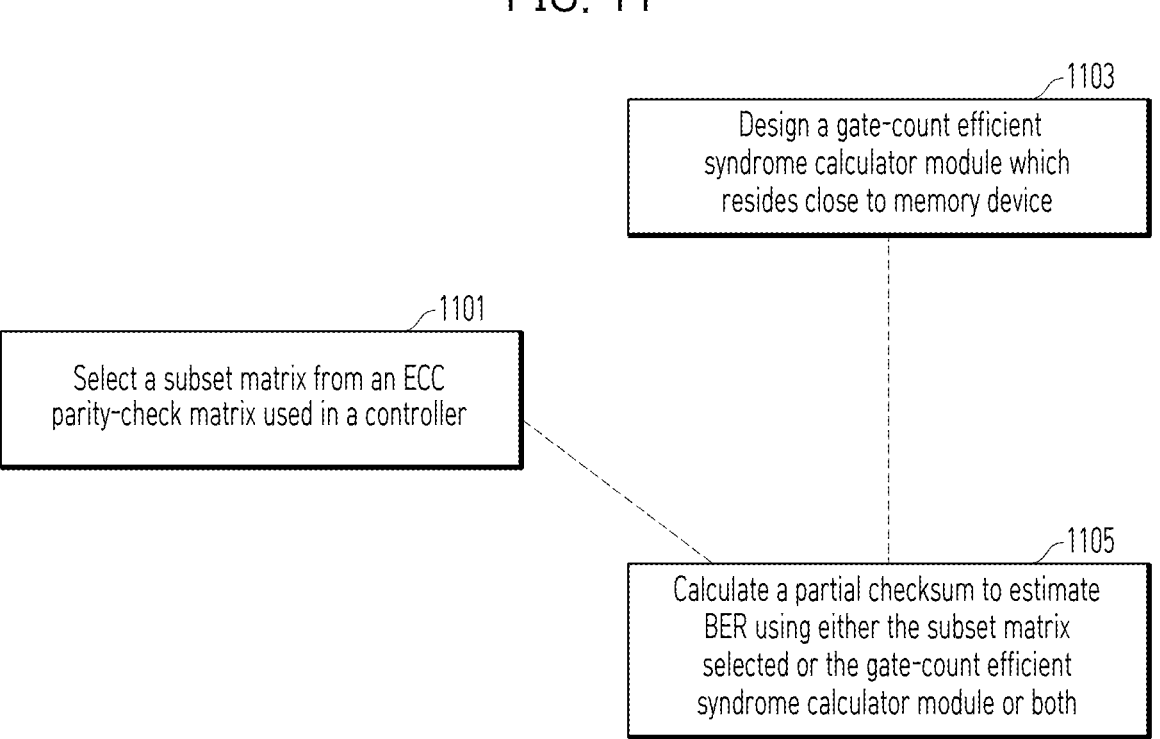
FIG. 11 is a schematic depiction of elements of the present invention provided for enabling the calculation of checksums in a controller inside a memory device.

According to various embodiments of the present invention, FIG. 11 is a schematic depiction of elements the present invention provided for facilitating the calculation of checksums of a controller, and in particular the calculation of checksums of a controller inside a memory device. Element 1101 represents the selection of a subset matrix (such as H1 shown in FIG. 7) derived from an error correction code (ECC) parity-check matrix used in the controller (such as derived the LDPC matrix H shown in FIG. 7). Element 1102 represents the design of a gate-count efficient syndrome calculator module which resides close to the memory device where actual data is stored (e.g., resides inside checksum calculator 510 of FIG. 5 which is inside NAND module 500). Element 1103 represents the calculation of a partial checksum to estimate a bit error rate (BER) using either the subset matrix selected in element 1101 and/or the gate-count efficient syndrome calculator module designed in element 1103. This method may be implemented in checksum calculator 510 of FIG. 5.

Figure 12:
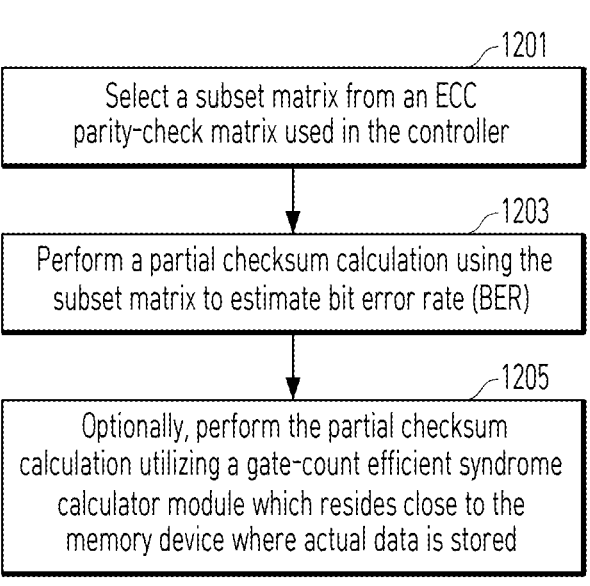
FIG. 12 is a flow chart illustrating one specific method for calculating checksums inside a storage of a memory system, according to another embodiment of the present invention.

In another embodiment of the present invention, there is provided a method (as depicted in FIG. 12) for calculating checksums inside a storage of a memory system. This method may be implemented in checksum calculator 510 of FIG. 5. In this method, at 1201, selecting a subset matrix from an ECC parity-check matrix used in a controller. At 1203, the method includes performing a partial checksum calculation using the subset matrix to estimate bit error rate (BER). Optionally, at 1205, the method includes performing the partial checksum calculation utilizing a gate-count efficient syndrome calculator module which resides close to the memory device where actual data is stored.

In this method, the performing a partial checksum calculation may perform the checksum calculation inside a NAND module.

In this method, the subset matrix has fewer check nodes than the ECC parity-check matrix. For example, the ECC parity-check matrix comprises m check nodes and the subset matrix has a reduced number of check nodes ranging from m/2 to m/8. In another example, the partial checksum is calculated using a punctured set of parity bits. In this method, for partial checksum calculations, circulant layers are selected that do not have nonzero elements corresponding to punctured parity bits.

In this method, partial checksum calculations can utilize quasi-cyclic codes comprising circulant layers selected from the ECC parity-check matrix, each circulant layer comprising a group of check nodes. Here, the partial checksum calculations can calculate checksums by counting non-zero syndrome bits for columns in the circulant layers (as illustrated in FIG. 7). Additionally, the checksum calculator is provided with code generation constraints identifying which entries of the (original) ECC parity-check matrix are used when more than one circulant layer is used. Moreover, prior to the partial checksum calculations, a shift value (representing bit shifts between different circulant layers) can be converted to zero for all nonzero circulant layers.

In this method, checksums can be calculated on scrambled-encoded data read from a buffer (such as page buffer 250) of a storage (such as memory blocks 211) of the memory system, where the scrambled-encoded data has information bits of the codeword data randomized.

Memory System

In another embodiment of the present invention, there is provided a memory system (such as in FIG. 3) having a storage (such as for example storage 550 in FIG. 5) and a checksum calculator (such as for example checksum calculator 510 in NAND Module 500) including a gate-count efficient syndrome calculator module which resides close to the memory device where actual data is stored.

The checksum calculator in the storage is configured to: select a subset matrix from an ECC parity-check matrix used in a controller of the storage, and perform a partial checksum calculation using the subset matrix to estimate bit error rate (BER) utilizing the gate-count efficient syndrome calculator module.

In this memory system, the checksum calculator may comprise: a first input for receiving the codeword data; a second input for receiving information on a reduced-size parity-check matrix; and a logic circuit configured to exclusive OR selected codeword data to generate checksums and to totalize the checksums from selected memory regions.

In this memory system, the checksum calculator may be configured to perform partial checksum calculations on the codeword data, and the partial checksum calculations may estimate a raw bit error in the codeword data.

In this memory system, the checksum calculator in performing the partial checksum calculations may be configured to utilize a reduced-size parity-check matrix having fewer check nodes than the ECC parity-check matrix. For example, the ECC parity-check matrix may comprise m check nodes and the reduced-size parity matrix has a reduced number of check nodes ranging from m/2 to m/8.

In this memory system, the partial checksum may be calculated using a punctured set of parity bits. In this memory system, the checksum calculator in performing the partial checksum calculations may be configured to utilize quasi-cyclic codes comprising circulant layers selected from the ECC parity-check matrix, each circulant layer comprising a group of check nodes. Here, the checksum calculator in performing the partial checksum calculations may be configured to calculate checksums by counting non-zero syndrome bits for columns in the circulant layers (as illustrated in FIG. 7). Also, prior to the checksum calculator performing the partial checksum calculations, a shift value (representing bit shifts between different circulant layers) is converted to zero for all nonzero circulant layers.

In this memory system, the performing a partial checksum calculation may calculates checksums on scrambled-encoded data read from a buffer of the storage of the memory system, and the scrambled-encoded data has information bits of the codeword data randomized.

In one exemplary embodiment, there is provided a NAND memory device comprising: a NAND storage; and a system on chip processor configured to process data exchanged between a host and the NAND storage. The NAND storage includes therein a checksum calculator including a gate-count efficient syndrome calculator module. The checksum calculator is configured to: select a subset matrix from an ECC parity-check matrix used in a controller of the NAND storage, and perform a partial checksum calculation using the subset matrix to estimate bit error rate (BER) utilizing the gate-count efficient syndrome calculator module.

In-NAND Checksum Calculator with Descrambler

Figure 13:
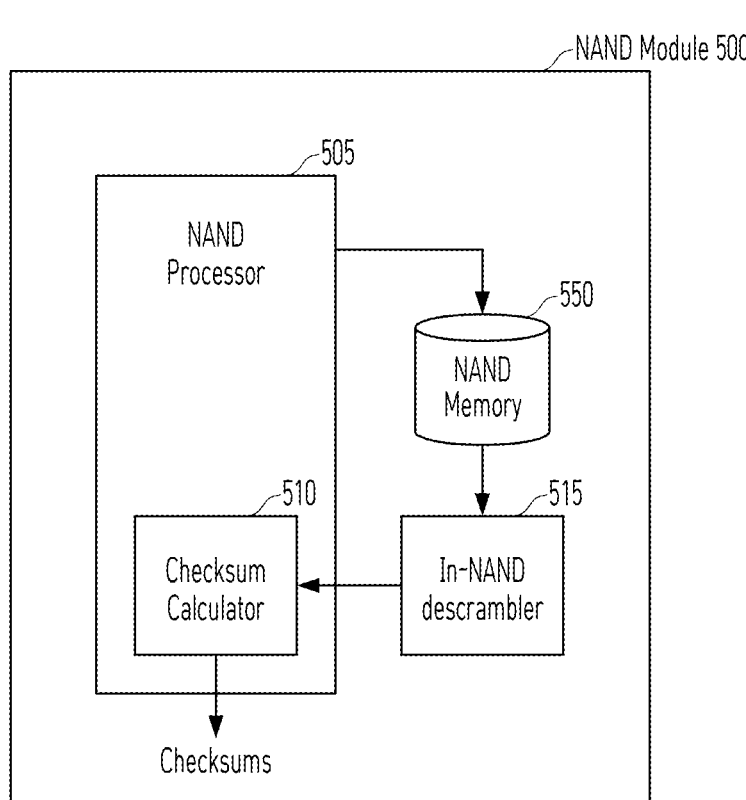
FIG. 13 is a diagram illustrating a storage system in accordance with embodiments of the present invention which includes an in-NAND descrambler.

FIG. 13 is a diagram illustrating a storage system in accordance with embodiments of the present invention where the NAND module 500 shown in FIG. 13 uses NAND memory 550 which may correspond to memory device 200 in FIG. 3.

Referring to FIG. 13, the NAND module 500 may include NAND memory 550 as storage and includes therein NAND processor 505. The NAND processor 505 may perform a read operation on data in NAND memory 550. During the read operation, the data needs to be descrambled to be in the correct format for computing checksums. Then, the checksum calculator is able to compute a checksum in order to estimate RBER. For instance, the relationship in FIG. 8 provides an example of determining RBER from a checksum. As noted above, when the number of the error bits is greater than or equal to a threshold number of correctable error bits, an error correction fail signal may be output, which indicates failure in correcting the error bits. Such failure may require that the information bits from a host will need to be sent again to NAND memory 550. Accordingly, checksum calculator 510 can be used to provide an estimate of the RBER in data to be stored in NAND memory 550. In one embodiment of the present invention, an In-NAND descrambler 515 is provided such that scrambled data read from NAND memory 550 may be descrambled prior to the read data being supplied to checksum calculator 510.

In various embodiments, the NAND Module 500 shown in FIG. 13 may be implemented using a variety of techniques including an application-specific integrated circuit (ASIC), a field-programmable gate array (FPGA), and/or a general purpose processor (e.g., an Advanced RISC Machine (ARM) core).

As more background, in SSD applications, non-host read requests from SOC (e.g., from control unit 12 in memory controller 100 of FIG. 3) can reduce the quality of service (QoS) and power. Referring back to FIG. 3, when the tasks of transferring non-host data to the SOC are performed, a substantial amount of data needs to be transferred between memory cell array 210 of the semiconductor memory device 200 and control unit 120 which causes a power drop. To reduce this power and performance (e.g., QoS) drop, one embodiment of the present invention avoids transferring, to the SOC, non-host data associated with non-host read request from a memory device (e.g., NAND module 500 of FIGS. 5 and 13). This can be done by estimating RBER in NAND module, and only transferring the non-host reads when the RBER is large.

In order to run these tasks more efficiently, in one embodiment of the present invention, the semiconductor memory device 200 (in FIG. 3) or NAND module 500 (in FIGS. 5 and 13) may measure the checksum to estimate the number of errors in the stored data. Such an in-NAND module calculating the RBER can improve the performance/power of SSD by eliminating the need to transfer the stored data to the SOC when the RBER is acceptable.

As shown in FIG. 13, in one embodiment of the present invention there is provided checksum calculator 510 inside NAND module 500. The in-NAND module 500 can be a processor with a minimum silicon area (gate count) and can calculate a checksum using the methods described herein.

As described in U.S. Pat. No. 11,502,703 (the entire contents of which are incorporated by reference), since programming data "as is" tends to decrease endurance (e.g., lifespan) or reliability of a memory system, a scrambler (or randomizer) randomizes data such that data is uniformly and more reliably programmed to a memory device. With reference to FIG. 3, data from a host may be scrambled by memory controller 100 to scramble the information bits in a codeword. The scrambled data having the scrambled information bits is passed to memory blocks 211. Subsequently, data read from memory blocks 211 cannot be directly used for calculating checksum (CS), and will need to be descrambled before a checksum calculation can be performed to determine if the unscrambled data has an acceptable RBER reflected by the checksum calculated.

Figure 14:
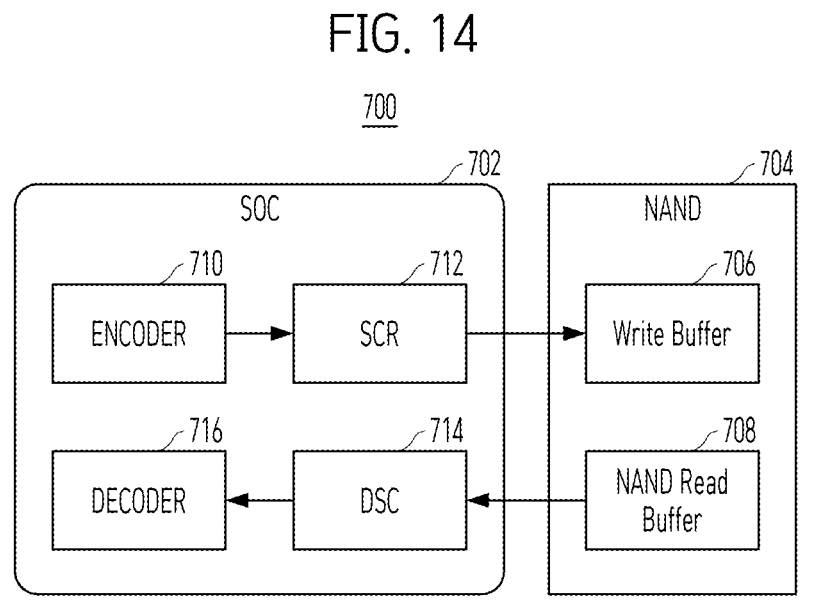

FIG. 14 depicts a block diagram of a memory system 700 having a SOC 702 and a NAND memory device 704 having write buffer 706 and read buffer 708. FIG. 14 depicts write/read channels operated with an ESN (Encoder-Scrambler-NAND) order. In the top channel depicted in FIG. 14, host write data first is encoded (e.g., in ECC unit 130 in memory controller 100), then the LDPC code (encoded data) generated by encoder 710 is scrambled by scrambler (SCR) 712 before being stored in memory device 704 or write buffer 706. During a read process, in the lower channel, data from NAND read buffer 708 is descrambled by descrambler (DSC) 714, and then the host data is recovered in decoder 716. In this system, as noted above, the data stored in NAND read buffer 708 is scrambled data and cannot be directly used for calculating CS.

In one embodiment of the present invention, an in-NAND checksum calculator using quasi-cyclic (QC) LDPC codes can handle scrambled read data using in-NAND descrambler 515 (noted above) along with the methods described below.

In-NAND CS Calculations for QC LDPC Codes

Details of the in-NAND CS module (for use with the ESN order detailed above) are provided below. In one embodiment of the present invention, the CS module can calculate CS for a fixed-size m (e.g., m=256 bits) QC-LDPC code. In one embodiment of the present invention, if the parity size of an original LDPC matrix H is larger than m (m=256 bits), the checksum can be calculated for one or more submatrices $H_{cs}$ where m should be a multiple of QC size of one submatrix $H_{cs}$, and the submatrices $H_{cs}$ should exhibit a quasi-cyclic property. In a quasi-cyclic parity check matrix, a parity check matrix H is composed of circular submatrices (or circulant layers) $H_{cs}$. A circulant submatrix is a square [q×q] binary matrix in which all rows are composed of the same elements and each row is a shifted version of a previous row, and formed by performing several-bit right-cyclic-shifts (or several-bit left-cyclic-shifts) on a base check matrix.

A. Universal QC-LDPC Codes

In one embodiment of the present invention, check sum (CS) calculator 220a or checksum calculator 510 can use the QC LDPC codes described above. In one embodiment, the CS calculator can work for any QC-LDPC code with a QC size=q. It can also work with any QC size=$q_1$ as long as q is a multiple of $q_1$ (e.g., q=256, $q_1$=32, 64 or 128), that is $q_1$ can range from q/2 to q/8. This attribute means that the CS calculator is universal and can work with an arbitrary set of QC circulants rather than only with a specifically sized circulant.

B. Gate-Count Efficient Descrambler

To reduce gate-count and latency of in-NAND descrambler, the in-NAND descrambler 515 (shown in FIG. 13) is designed to operate at a relatively slower speed (compared to the clock speed for reading data) and therefore can use fewer gates operating in parallel to pre-generate a sequence for descrambling the data. This descrambling sequence can be stored in a 4K buffer for use when scrambled data is supplied for descrambling. In one embodiment, the descrambling generates the descrambling sequence during the time-to-read (tR) from NAND memory 550 all the scrambled data necessary for the processing of one cycle of checksum calculations. In one embodiment, in-NAND descrambler 515 can perform a 4K bit exclusive OR (XOR) (comparing values of the descrambling sequence to the values of the scrambled data) to descramble the data in one-shot, thereby needing only one cycle latency to descramble the data.

C. Acceptable H Matrix Formats

Figure 15A:
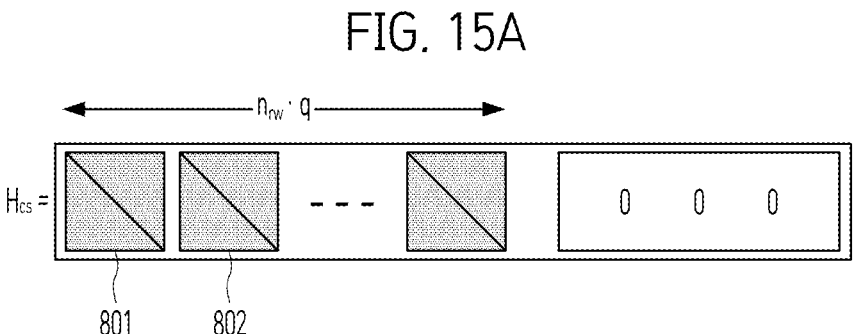
FIG. 15A is a diagram a single layer parity check sub-matrix in accordance with embodiments of the present invention.

FIG. 15A is a diagram a single layer parity check submatrix $H_{cs}$ where all the non-zero circulants are located (or reshuffled to be) on the left side (or at the beginning) of $H_{cs}$. In FIG. 15A, the submatrix $H_{cs}$ is single layer with QC size=q. In FIG. 8A, the product of the row weight $n_{rw}$ (the number of non-zero entries on a row) and q defines the extent of the non-zero entries across $H_{cs}$. The diagonal lines in each circulant 801, 802, . . . represent entries with all ones (1s).

Figure 15B:
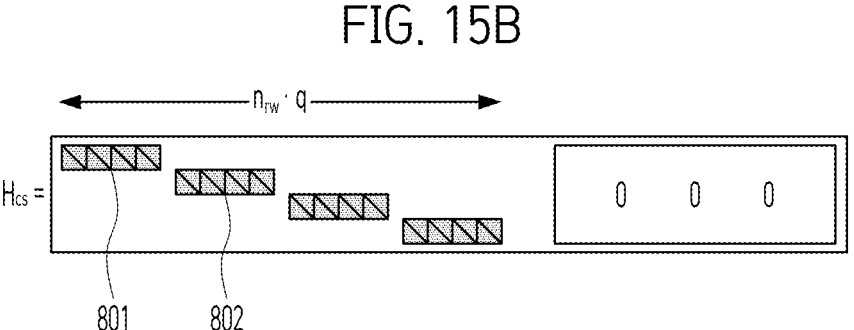
FIG. 15B is diagram of a multiple layer parity check submatrix which has a stair case property in accordance with embodiments of the present invention.

FIG. 15B is a diagram of a multiple layer parity check submatrix $H_{cs}$ which has a stair case property in which all the non-zero circulants are positioned (reshuffled to be) on the left side of the matrix $H_{cs}$. In FIG. 15B, the submatrix has multiple layers, and the QC size $q_1$ is divisible by q. (e.g., q=256, $q_1$=64). As with FIG. 15A, the diagonal lines in each circulant 801, 802, . . . shown in FIG. 15B represent entries with all 1s.

Using the parity check submatrices $H_{cs}$ shown in FIGS. 15A and 15B does not place any restriction on the LDPC code generation process. Furthermore, using the submatrices $H_{cs}$ shown in FIGS. 15A and 15B minimizes the data needed for storing data for the low density parity check matrix calculations because the data from the regions having all zeros need not be stored. Instead, the checksum calculator would be programmed to know that all those values were zero without having to read values for those regions read from a storage.

The following method can be used to process any QC-LDPC code to find such submatrices $H_{cs}$. Given an H matrix size of in-NAND CS module of m (such as for example the m=256 bits noted above), the method may determine the number of layers (or circulants) as $m_q$=m/q. The method may Identify $m_q$ disjoint layers in the H matrix. In a normal checksum design, there exists a module called a "barrel shifter" which aligns or permutes the columns for each row or each circulant column before computing syndrome(s) through the XOR operation. This module permutes the non-zero circulant columns with non-zero shift into identity matrix (shift=0). This module is known to consume gate-counts. Since the in-Nand checksum calculator is gate-count efficient, the barrel shifter module was eliminated by making all the non-zero circulants to be an identity matrix. To do so, on each non-zero column of $H_{cs}$, there should be only one non-zero circulant. That means, the circulant rows of $H_{cs}$ should be disjoint. If this property holds, then all the non-zero non-identity circulant submatrices can be made into identity matrices simply by permuting the circulant columns of the original H matrix. Accordingly, in one embodiment, the method may permute (or reshuffle) the H matrix so that the shift value for each nonzero column becomes 0, and move all the nonzero circulants to the left side (or the beginning) of matrix H so that a staircase format is obtained as shown in FIG. 15B. The non-zero circulants appear as an identity matrix where the values on the diagonal are 1 and the rest of the values are all 0.

D. In-NAND CS Module Design

Figure 16:
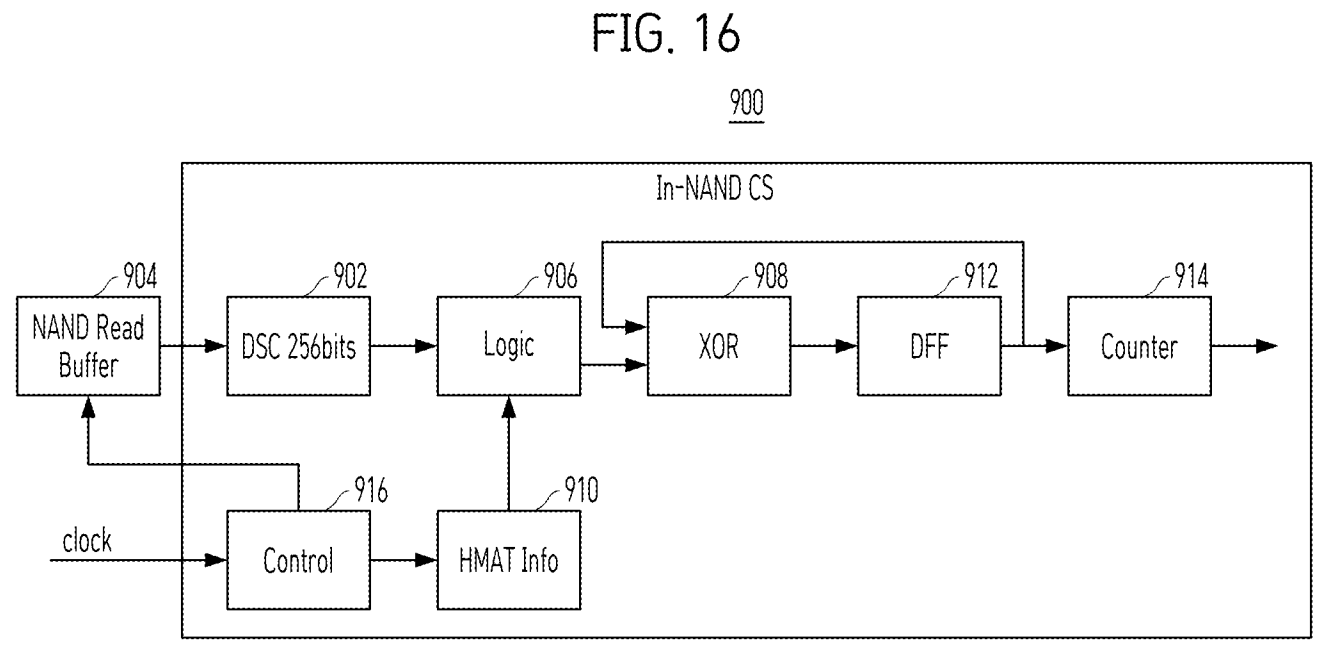

FIG. 16 is a block diagram of an in-NAND CS module according to one embodiment of the present invention. FIG. 16 shows an in-NAND CS module 900 which computes CS using the following components. A descramble module 902 of size q (e.g., q=256 bits) receives scrambled bits from NAND read buffer 904 and outputs q-bits of descrambled data at each cycle of reading the scrambled bits from NAND read buffer 904. Logic 906 (e.g., comprising one or more AND gates) compares bits of the descrambled data to column entry values of the $H_{sc}$ matrix stored in HMAT information register 910 and outputs a "1" value when both inputs are high. HMAT information register 910 contains information about the entry values in party check matrix H or submatrices $H_{cs}$ (such as the submatrices $H_{cs}$ shown in FIGS. 15A and 15B) used in the checksum calculations. This information may describe characteristics of the parity-check matrix such as for example codeword length, number of information bits, circulant size, number of layers, and the like.

Output from Logic 906 is provided to an exclusive OR (XOR) gate 908 which outputs a "1" value when both inputs are different. XOR gate 908 XORs the current bits with all the previous corresponding bits which have been XORed in the cycle reading the scrambled bits from NAND read buffer 904. HMAT information register 910 provides proper circulant columns for each of the circulants of the $H_{sc}$ matrix being processed. A delay flip-flop DFF 912 stores the XORed results for each syndrome bit and outputs the XORed results in sequence with a clock signal. Counter 914 counts the number of 1's in the output bits of DFF 912 for the checksum value. The checksum value (or syndrome weight) is number of 1's in the syndrome sequence. Controller 916 (in response to clock signal) times when the scrambled bits from NAND read buffer 904 are output to descramble module 902 and times when the HMAT information is provided to logic 906. Components 906, 908, 910, 912, and 914 shown in FIG. 16 constitute a checksum calculator 220a of FIG. 3 or 510 of FIGS. 5 and 13.

The NAND module design illustrated in FIG. 16 can compute the CS in $n_{rw}+1$ cycles, which only needs one additional cycle to compute CS from the scrambled data. This NAND module design hides most of latency needed to compute the CS in the time that is needed to descramble the data such that the time to descramble data does not prolong the total time for checksum calculations. For example, when a new process is done in parallel (at the same time) with another existing operation, then the latency of the new process is not added to total latency, and the latency of new process is regarded as hidden. The total silicon area needed for computing CS in the NAND module design illustrated in FIG. 16 is less than 50% of the area needed to compute CS in a SOC design as shown in FIG. 14.

Accordingly, the in-NAND module design described above can improve the performance/power of SSD by eliminating the need to transfer the stored data to SOC for descrambling. In another embodiment, by using QC LDPC codes, the in-NAND module can calculate checksums usually with only a few clock cycles to provide an estimate of RBER for the stored data.

Computerized Method with Data Descrambling

Figure 17:
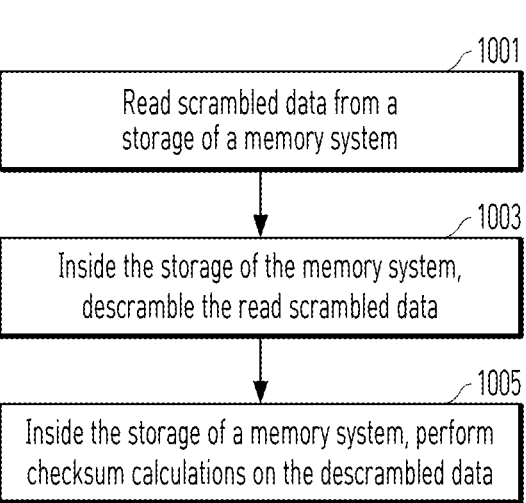
FIG. 17 is a flow chart illustrating a method for calculating checksums on scrambled data read from a storage of a memory system according to another embodiment of the present invention.

In one embodiment of the present invention, there is provided a method (as depicted in FIG. 17) for calculating checksums on scrambled data read from a storage device. This method may be implemented in control circuit 220 of FIG. 3 or may be implemented in checksum calculator 510 of FIG. 13. This method includes, at 1001, reading scrambled data from a storage of a memory system. At 1003, inside the storage of a memory system, the method includes descrambling the read data. At 1105, inside the storage of a memory system, the method includes performing checksum calculations on the descrambled data.

In this method, the checksum calculations can provide an estimate for a raw bit error in the descrambled data.

In this method, the checksum calculations can use submatrices $H_{cs}$ of a LDPC matrix H to calculate the checksums. The submatrices $H_{cs}$ can be formed by reshuffling columns of the LDPC matrix H to move all the nonzero columns toward a beginning of the LDPC matrix H to form the submatrices $H_{cs}$ having a reduced matrix size compared to the LDPC matrix H. The reshuffling columns of the LDPC matrix H can result in the submatrices $H_{cs}$ being a set of identity matrices where values on diagonals are 1 and remaining values are all 0. Here, the LDPC matrix H may comprise q check nodes and the submatrices $H_{cs}$ may comprise a reduced number of check nodes q1 ranging from q/2 to q/8.

In this method, the submatrices $H_{cs}$ may comprise a single layer of matrices disposed all on one side of the reshuffled LDPC matrix H. Alternatively, the submatrices $H_{cs}$ may comprise stair-cased layers of matrices disposed all on one side of the reshuffled LDPC matrix H.

In this method, the descrambling the scrambled data may generate a descrambling sequence during a time period when the scrambled data is read from the storage of the memory system, and descramble the scrambled data using the descrambling sequence.

In this method, the checksum calculations may a) compare with an AND gate bits of descrambled data to column entry values a low density parity check LDPC matrix H, b) exclusive XOR a compared bit with previous bits having been XORed in a cycle of reading the scrambled data from the storage of the memory system, c) store the XORed results for each syndrome bit, and d) count for a checksum value the number of 1's stored in the XORed results.

Memory System with Descrambler

In another embodiment of the present invention, there is provided a memory system (such as in FIG. 3) having a storage (such as for example storage 550 in FIG. 13) having a checksum calculator (such as for example checksum calculator 510 in NAND Module 500) and a descrambler (such as descrambler 515 in FIG. 13 or descrambler 902 in FIG. 16). The descrambler inside the storage is configured to descramble scrambled data read from the storage of the memory, and the checksum calculator inside the storage is configured to perform checksum calculations on the descrambled data.

In this memory system, the checksum calculations provide an estimate for a raw bit error in the descrambled data.

In this memory system, the checksum calculator is configured to use submatrices $H_{cs}$ of a LDPC matrix H to calculate the checksums. The submatrices $H_{cs}$ can be formed by reshuffling columns of the LDPC matrix H to move all the nonzero columns toward a beginning of the LDPC matrix H to form the submatrices $H_{cs}$ having a reduced matrix size compared to the LDPC matrix H. The reshuffling columns of the LDPC matrix H can result in the submatrices $H_{cs}$ being a set of identity matrices where values on diagonals are 1 and remaining values are all 0. Here, the LDPC matrix H may comprise q check nodes and the submatrices $H_{cs}$ may comprise a reduced number of check nodes q1 ranging from q/2 to q/8.

In this memory system, the submatrices $H_{cs}$ may comprise a single layer of matrices disposed all on one side of the reshuffled LDPC matrix H. Alternatively, the submatrices $H_{cs}$ may comprise stair-cased layers of matrices disposed all on one side of the reshuffled LDPC matrix H.

In this memory system, the descrambler is configured to generate a descrambling sequence during a time period when the scrambled data is read from the storage of the memory system, and descramble the scrambled data using the descrambling sequence.

In this memory system, the checksum calculator is configured to a) compare with an AND gate bits of descrambled data to column entry values a low density parity check LDPC matrix H, b) exclusive XOR a compared bit with previous bits having been XORed in a cycle of reading the scrambled data from the storage of the memory system, c) store the XORed results for each syndrome bit, and d) count for a checksum value the number of 1's stored in the XORed results.

As described above, In-Memory partial checksum calculation provides many system level benefits including performance, QoS and power. The partial checksum calculation may be performed in a memory device (i.e., memory device 200 of FIG. 3, and NAND module 500 of FIGS. 5 and 13) without transferring the raw data from the memory device to a controller (i.e., controller 100 of FIG. 3). Only syndrome weight is transferred from the memory device to the controller and used to estimate the actual number of errors in media (i.e., memory cell array 210 of memory device 200 in FIG. 3, and NAND memory 550 of NAND module 500 in FIGS. 5 and 13). The partial checksum calculation only uses a portion of media bits in a codeword (or codeword sequence) read from the media, and hence may have some reliability risk when errors are not evenly distributed on media or simply due to larger variance of the partial checksum compared to full checksum. To reduce the reliability risk, embodiments of the present invention described below provide a scheme to perform a checksum calculation in media without necessarily increasing hardware complexity or latency in the memory device (i.e., NAND) comparing to the partial checksum calculation scheme(s) disclosed in paragraphs associated with FIGS. 13-17.

Simplified Syndrome/Partial Syndrome Calculation

For classical syndrome calculation, a noisy codeword is multiplied with an entire parity check matrix. Different from the classical syndrome calculation, simplified partial syndrome calculation scheme(s) are described in FIGS. 13-17. In one scheme described there, multiple circulant rows can be selected and combined into a smaller (in row) parity check matrix and multiplied with the noisy codeword for a partial syndrome calculation. This scheme can reduce area penalty and latency in NAND.

However, one issue recognized by the present invention is that the partial syndrome calculation scheme(s) of FIGS. 13-17 can only cover a small portion of media bits, and hence is prone to clustered/burst errors. Due to the partial media coverage, the variance of the checksum distribution for a given fail-bit-count (FBC) on media is larger compared to full media coverage based checksum. This can cause higher miss-detection (i.e., the FBC is high but the partial checksum is low) and false-alarm (i.e., the FBC is low but the partial checksum is high) probability, compared to a full checksum.

Accordingly, embodiments of the present invention described below provide a scheme that can significantly improve media coverage in the partial checksum calculation while the gate-count/area and latency in implementation remains the same or similar as the scheme(s) of FIGS. 13-17.

Row-Disjoint Constraint in Parity Check Matrix

In order to facilitate one scheme of the present invention, in one embodiment, the parity check matrix operates with the constraints described below.

Figure 18:
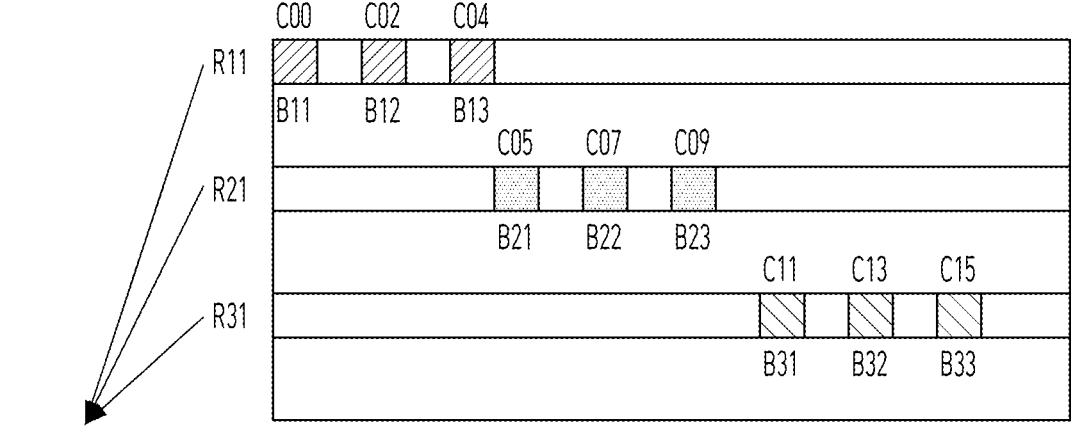
FIG. 18 is a diagram illustrating one example of an original parity check matrix in accordance with another embodiment of the present invention.

FIG. 18 illustrates one example of the parity check matrix used here. As illustrated in FIG. 18, assume there are 3 circulant rows R11, R21, R31 selected to be used to calculate a partial checksum. In order to construct the parity check matrix, some non-zero circulants may be filled in each row selected from among multiple matrix rows of the parity check matrix. In each of the rows R11, R21, R31 of FIG. 18, boxes B11-B13, B21-B23, B31-B33 indicate non-zero circulants.

As shown in FIG. 18, all the non-zero circulants filled in may be identity matrices. That is, the boxes B11-B13, B21-B23, B31-B33 may be identity matrices. For this reason, no barrel shifter is needed in the partial checksum calculation. All non-zero circulants may not be overlapped with another non-zero circulants on the same column. That is, the boxes B11-B13, B21-B23, B31-B33 are not overlapped with each other.

The non-zero circulants (i.e., boxes) with the same shape may be placed together so that there is no interleaving across all columns. That is, as shown in this embodiment, the boxes B11-B13 are placed together on row R11, the boxes B21-B23 are placed together on row R21, and the boxes B31-B33 are placed together on row R21. Additionally, having zero circulants in between non-zero circulants with the same shape may be allowed. For example, zero circulants are placed in between the box B11 and the box B12, and between the box B12 and the box B13. Zero circulants are placed in between the box B21 and the box B22, and between the box B22 and the box B23. Zero circulants are placed in between the box B31 and the box B32, and between the box B32 and the box B33.

In some embodiments, the number of selected rows may be an arbitrary number (e.g., 3 rows in FIG. 18), and all media bits (i.e., bits of codeword sequences read from a memory cell array) may be maximally covered by non-zero circulants. Other than these selected rows, other rows may be constructed according to certain column weight and other constraints.

Syndrome/Partial Syndrome Calculation

Figure 19A:
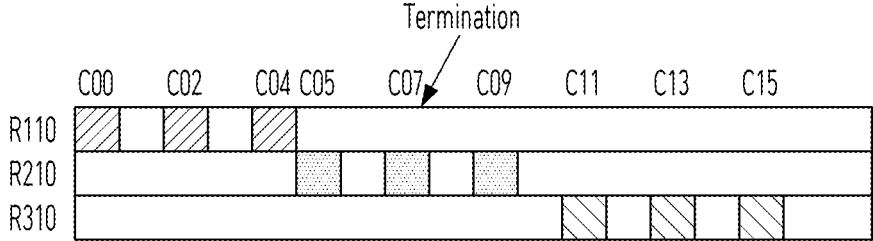
FIGS. 19A and 19B are diagrams illustrating sub-matrices and syndrome register arrays for a partial checksum calculation in accordance with another embodiment of the present invention.
Figure 19B:
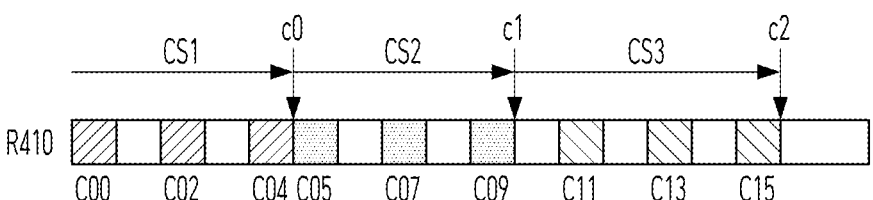

With the row-disjoint constraint in the parity check matrix shown in FIG. 18, the partial checksum can be calculated in the similar way as the scheme(s) of FIGS. 13-17. The length of a register array (registers) used to calculate syndrome (syndrome weight) may be determined based on the number of circulant rows selected for a partial checksum calculation, and a circulant size. In some embodiments, the length of the register array used to calculate syndrome may be equal to the number of circulant rows selected for the partial checksum calculation multiplied by the circulant size. For example, the syndrome register array may have three (3) rows as shown in FIG. 19A, or one (1) row as shown in FIG. 19B. That is, the row syndrome register array (i.e., 3 rows) in FIG. 19A corresponds to the sub-matrix including 3 matrix rows selected from multiple matrix rows of the parity check matrix in FIG. 18, and the syndrome register array (i.e., 1 row) in FIG. 19B corresponds to the sub-matrix including one matrix row generated by merging 3 matrix rows selected from multiple matrix rows of the parity check matrix in FIG. 18.

Method 1

FIG. 19A illustrates a sub-matrix and a syndrome register array for a partial checksum calculation in accordance with embodiments of the present invention.

In the example in FIG. 19A, for syndrome calculation for a parity check matrix of circulant size 128, NAND (e.g., NAND module 500 of FIG. 13) needs to store a sub-matrix of a size {3*128 by 288*128} and use registers of a length {3*128}. Here, 3 represents the number of matrix rows selected from the original parity check matrix, 128 represents the circulant size, and 288 represents the total number of circulant columns for the codeword (for the non-punctured part). It is noted that a memory needed to store the sub-matrix is of size 3*288 because all non-zero circulants are identity matrices. Since the nonzero elements are part of an identity matrix, for each identity circulant matrix, only one bit is needed to store. Thus, for each circulant q×q, it is either all zero or identity. Thus, one bit is enough to store it in memory. If the number of selected circulant rows is $m_q$=3 and the total number of circulant columns is $n_q$=288, the partial syndrome H matrix by $m_q$×$n_q$ bits can be stored.

In some embodiments, a parity check matrix with a variety number of selected rows may be constructed in order to provide a flexible media coverage percentage up to 100%. When the partial syndrome is calculated, the partial syndrome calculation can be terminated at any cycle (e.g., see "Termination" of FIG. 19A) and provide a tradeoff between accuracy and latency. For example, if 4 rows are selected from among a parity check matrix and [25%, 25%, 25%, 25%] of codeword bits (media bits) are covered by each row so that totally 100% of codeword bits are covered by the selected 4 rows. If the partial syndrome calculation is terminated at the end of each 25%, then 25%, 50%, 75%, or 100% of the media bits can be covered in this embodiment. This provides a tradeoff between latency and media coverage percentage.

Method 2

The area/gate-count of NAND required by Method 1 increases as the number of selected rows grows. This increase could be costly in NAND as gate size is much larger than the one in a logic application-specific integrated circuit (ASIC). To reduce the area/gate-count, Method 2 is provided. Method 2 can keep the area/gate-count unchanged as the number of selected rows grows.

Row Merging

FIG. 19B illustrates a sub-matrix and a syndrome register array for a partial checksum calculation in accordance with embodiments of the present invention.

The first embodiment to save area/gate-count is to merge all selected rows into one as shown in FIG. 19B. FIG. 19B shows the sub-matrix that NAND needs to know/store in order to calculate the partial checksum. Because the selected rows of FIG. 18 satisfied the row-disjoint constraint, all selected rows R11, R21, R31 can be merged into one row R410 as shown in FIG. 19B. A NAND only needs to store a sub-matrix of a size {1*128 by 288*128} for the arbitrary number of selected rows (i.e., 3 rows). It is noted that embodiments of Method 2 only need to use 288 bits to store such matrix because all non-zero circulants are identity matrices.

Syndrome Register Reuse

The second embodiment to save area/gate-count is to use only one merged row of registers for syndrome calculation when an arbitrary number of rows are selected for a partial syndrome calculation. In the illustrated example of FIGS. 18 and 19B, 3 rows R11, R21, R31 are selected for a partial syndrome calculation, but only one row of registers (i.e., 128 bits of registers) R410 can be used for the syndrome calculation. That is, the one row of registers for one row of the selected rows can be reused for another row of the selected rows.

Syndrome/Partial Syndrome Calculation

With the row merging and syndrome register reuse as describe above, the syndrome/partial syndrome calculation may be performed section by section. Denote a column section as the columns in the merged row R410 that contains boxes with the same shape. That is, the merged row R410 may include multiple column sections. In the illustrated example of FIG. 19B, column 1 to column c0 (i.e., C00-C04) is denoted as a first column section CS1, column c0+1 to column c1 (i.e., C05-C09) is denoted as a second column section CS2, and column c1+1 to column c2 (i.e., C10-C15) is denoted as a second column section CS3. The syndrome (or syndrome weight) calculation can be shown as shown in List 1:

| List 1: |
| --- |
| 1.   Set syndrome_registers to all 0 |
|       Set total_syndrome_weight=0 |
|       Set section_syndrome_weight=0 |
| 2.   For column section k=1:K |
|      a.   For column j in column section k |
|          i. Calculate syndrome_registers for j-th column |
|      b.   Calculate section_syndrome_weight for k-th column section. |
|      c.   Total_syndrome_weight = total_syndrome_weight + section_syndrome_weight |
|      d.   Reset syndrome_registers to all 0, reset section_syndrome_weight=0 |
|      e.   If T=k break; |

Referring to List 1, an initial operation is performed (i.e., Operation 1). Then, a partial syndrome calculation is performed for each column section (i.e., Operation 2) to generate a corresponding section syndrome weight. The partial syndrome calculation is repetitively and sequentially performed for all column section. Once calculation is finished, the total_syndrome_weight is the partial checksum as output of the algorithm. Although List 1 shows the partial syndrome calculation associated with FIG. 19B, the partial syndrome calculation associated with FIG. 19A may be performed in a similar way.

Flexible Media Coverage

The syndrome weight calculation algorithm of List 1 may be terminated at a column section k, where k=[1, 2, . . . , K]. This scheme can provide a flexible media coverage in the partial checksum calculation, which provides a tradeoff between latency and media coverage.

FIG. 20 is a flow chart illustrating one specific method 2000 for performing an in-memory partial checksum calculation with flexible media coverage, inside a storage of a memory system, according to another embodiment of the present invention.

Referring to FIG. 20, the method 2000 may be performed by a memory system including a controller (e.g., memory controller 100 of FIG. 3) and a memory device (e.g., memory device 200 of FIG. 3 or NAND module 500 of FIGS. 5 and 13). The controller may encode write data using a parity check matrix to generate a codeword sequence. The memory device may include a plurality of memory cells, a control circuit (e.g., control circuit 220 of FIG. 3 or NAND processor 505 of FIGS. 5 and 13) and a partial checksum calculator (e.g., checksum calculator 220a of FIG. 3 or checksum calculator 510 of FIGS. 5 and 13). The memory device may receive the codeword sequence from the controller, store the codeword sequence in the plurality of memory cells, and read the codeword sequence from the plurality of memory cells.

The method 2000 may include, by the control circuit, reading a codeword sequence from a plurality of memory cells (2010). The method 2000 may include determining a sub-matrix including multiple non-zero circulants selected from particular matrix rows of a parity check matrix used in a controller of the memory system, the multiple non-zero circulants including non-zero row circulants for each matrix row (2020). The method 2000 may include performing a partial checksum calculation on a syndrome sequence based on the codeword sequence and the sub-matrix (2030).

In some embodiments, the multiple non-zero circulants form identity matrices.

In some embodiments, non-zero row circulants of one matrix row are not overlapped with non-zero row circulants of another matrix row on a same column.

In some embodiments, non-zero row circulants of one matrix row are placed together in a same row of the sub-matrix.

In some embodiments, the matrix rows include two or more matrix rows.

In some embodiments, the sub-matrix includes two or more sub-matrix rows, each sub-matrix row corresponding to each matrix row.

In some embodiments, the partial checksum calculation is performed using a syndrome register array including register rows corresponding to the two or more sub-matrix rows.

In some embodiments, the performing of the partial checksum calculation includes calculating a total syndrome weight of the syndrome sequence by sequentially calculating a syndrome weight of each register row.

In some embodiments, the partial checksum calculation is performed using a syndrome register array including one register row corresponding to one matrix row generated by merging the two or more matrix rows, and the register row includes multiple column sections corresponding to the two or more sub-matrix rows, respectively.

In some embodiments, the performing of the partial checksum calculation includes calculating a total syndrome weight of the syndrome sequence by sequentially calculating a syndrome weight of each column section.

As described above, embodiments provide a scheme for a partial checksum calculation using a sub-matrix with flexible media coverage inside of a memory device (i.e., NAND) of a memory system. This scheme can improve media coverage in the partial checksum calculation.

Although the foregoing embodiments have been described in some detail for purposes of clarity of understanding, the invention is not limited to the details provided. There are many alternative ways of implementing the invention. The disclosed embodiments are illustrative and not restrictive. The present invention is intended to embrace all modifications and alternatives of the disclosed embodiment. Furthermore, the disclosed embodiments may be combined to form additional embodiments.

Indeed, implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field-programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be excised from the combination, and the combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A memory device in a memory system, comprising:
a plurality of memory cells;
a control circuit in the memory device and configured to read a codeword sequence from the plurality of memory cells, and determine a sub-matrix including multiple non-zero circulants selected from particular matrix rows of a parity check matrix used in a controller of the memory system, the multiple non-zero circulants including multiple non-zero row circulants for each matrix row, wherein each non-zero circulant selected from the parity check matrix comprises a square matrix comprising an identity matrix having diagonal values of '1' and all remaining values of '0'; and
a partial checksum calculator configured to perform a partial checksum calculation on a syndrome sequence based on the codeword sequence and the sub-matrix.

2. The memory device of claim 1, wherein the multiple non-zero circulants are selected from the parity check matrix after a reshuffle of the parity check matrix such that a shift value for each nonzero column becomes 0.

3. The memory device of claim 2, wherein the multiple non-zero row circulants of one matrix row are not overlapped with the multiple non-zero row circulants of another matrix row on a same column, and
the multiple non-zero row circulants of the parity check matrix after the reshuffle have a staircase format.

4. The memory device of claim 1, wherein the multiple non-zero row circulants of one matrix row are placed together in a same row of the sub-matrix.

5. The memory device of claim 1, wherein the matrix rows include two or more matrix rows.

6. The memory device of claim 5, wherein the sub-matrix includes two or more sub-matrix rows, each sub-matrix row corresponding to each matrix row.

7. The memory device of claim 6, wherein the partial checksum calculator includes a syndrome register array including register rows corresponding to the two or more sub-matrix rows.

8. The memory device of claim 7, wherein the partial checksum calculator calculates a total syndrome weight of the syndrome sequence by sequentially calculating a syndrome weight of each register row.

9. The memory device of claim 6, wherein the partial checksum calculator includes a syndrome register array including one register row corresponding to one matrix row generated by merging the two or more matrix rows, and
wherein the register row includes multiple column sections corresponding to the two or more sub-matrix rows, respectively.

10. The memory device of claim 9, wherein the partial checksum calculator calculates a total syndrome weight of the syndrome sequence by sequentially calculating a syndrome weight of each column section.

11. A method for operating a memory device of a memory system, the method comprising:
reading a codeword sequence from a plurality of memory cells;
determining by the memory device a sub-matrix including multiple non-zero circulants selected from particular matrix rows of a parity check matrix used in a controller of the memory system, the multiple non-zero circulants including multiple non-zero row circulants for each matrix row, wherein each non-zero circulant selected from the parity check matrix comprises a square matrix comprising an identity matrix having diagonal values of '1' and all remaining values of '0'; and
performing a partial checksum calculation on a syndrome sequence based on the codeword sequence and the sub-matrix.

12. The method of claim 11, wherein the multiple non-zero circulants are selected from the parity check matrix after a reshuffle of the parity check matrix such that a shift value for each nonzero column becomes 0.

13. The method of claim 12, wherein, in determining the sub-matrix, the multiple non-zero row circulants of one matrix row are not overlapped with the multiple non-zero row circulants of another matrix row on a same column, and
the multiple non-zero row circulants of the parity check matrix after the reshuffle have a staircase format.

14. The method of claim 11, wherein the multiple non-zero row circulants of one matrix row are placed together in a same row of the sub-matrix.

15. The method of claim 11, wherein the matrix rows include two or more matrix rows.

16. The method of claim 15, wherein the sub-matrix includes two or more sub-matrix rows, each sub-matrix row corresponding to each matrix row.

17. The method of claim 16, wherein the partial checksum calculation is performed using a syndrome register array including register rows corresponding to the two or more sub-matrix rows.

18. The method of claim 17, wherein the performing of the partial checksum calculation includes calculating a total syndrome weight of the syndrome sequence by sequentially calculating a syndrome weight of each register row.

19. The method of claim 16, wherein the partial checksum calculation is performed using a syndrome register array including one register row corresponding to one matrix row generated by merging the two or more matrix rows, and
wherein the register row includes multiple column sections corresponding to the two or more sub-matrix rows, respectively.

20. The method of claim 19, wherein the performing of the partial checksum calculation includes calculating a total syndrome weight of the syndrome sequence by sequentially calculating a syndrome weight of each column section.

\* \* \* \* \*